United States Patent
Wang

(10) Patent No.: US 12,221,133 B2
(45) Date of Patent: Feb. 11, 2025

(54) METHOD FOR AUTOMATIC CONTROL OF VEHICLE AND METHOD FOR TRAINING LANE CHANGE INTENTION PREDICTION NETWORK

(71) Applicant: TENCENT TECHNOLOGY (SHENZHEN) COMPANY LIMITED, Shenzhen (CN)

(72) Inventor: Jue Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 573 days.

(21) Appl. No.: 17/553,696

(22) Filed: Dec. 16, 2021

(65) Prior Publication Data

US 2022/0105961 A1    Apr. 7, 2022

Related U.S. Application Data

(63) Continuation of application No. PCT/CN2020/117384, filed on Sep. 24, 2020.

(30) Foreign Application Priority Data

Oct. 16, 2019    (CN) .......................... 201910984614.0

(51) Int. Cl.
  B60W 60/00    (2020.01)
  B60W 50/00    (2006.01)
  G06N 20/00    (2019.01)

(52) U.S. Cl.
  CPC .... B60W 60/0027 (2020.02); B60W 50/0098 (2013.01); G06N 20/00 (2019.01);
  (Continued)

(58) Field of Classification Search
  CPC ......... B60W 60/0027; B60W 50/0098; B60W 2050/0022; B60W 2552/05;
  (Continued)

(56) References Cited

U.S. PATENT DOCUMENTS 9,984,572 B1 * 5/2018 Newman .......... G08G 1/096758
2005/0015203 A1    1/2005 Nishira
(Continued)

FOREIGN PATENT DOCUMENTS

CN    104104915 A    10/2014
CN    104135650 A    11/2014
(Continued)

OTHER PUBLICATIONS

Translation on CN 109670277 A (Year: 2019).*
(Continued)

Primary Examiner — Russell Frejd
(74) Attorney, Agent, or Firm — ANOVA LAW GROUP PLLC

(57) ABSTRACT

The present disclosure provides a method for automatic control of a vehicle and a method for training lane change intention prediction network. The method includes receiving a plurality of types of vehicle traveling information of a target vehicle; inputting the plurality of types of vehicle traveling information of the target vehicle into a lane change intention prediction network, the lane change intention prediction network comprising a plurality of sub-networks; performing, through the sub-networks, feature extraction on the types of vehicle traveling information respectively, and outputting feature extraction results; performing feature fusion on the feature extraction results outputted by the sub-networks, and predicting a lane change intention of the target vehicle according to a feature fusion result; and
(Continued)

updating an autonomous driving route of a current vehicle according to the lane change intention of the target vehicle.

18 Claims, 12 Drawing Sheets

(52) U.S. Cl.
CPC . *B60W 2050/0022* (2013.01); *B60W 2552/05* (2020.02); *B60W 2552/53* (2020.02); *B60W 2554/4041* (2020.02); *B60W 2554/4042* (2020.02); *B60W 2554/4043* (2020.02); *B60W 2554/4044* (2020.02); *B60W 2554/4045* (2020.02); *B60W 2554/803* (2020.02); *B60W 2554/804* (2020.02); *B60W 2555/60* (2020.02)

(58) Field of Classification Search
CPC ..... B60W 2552/53; B60W 2554/4041; B60W 2554/4042; B60W 2554/4043; B60W 2554/4044; B60W 2554/4045; B60W 2554/803; B60W 2554/804; B60W 2554/4049; B60W 2555/60; G06N 20/00; G06N 3/044; G06N 3/045; G06N 3/08; G06V 10/80; G06V 10/806; G06V 10/82; G06V 20/56; G08G 1/163; G08G 1/164; G08G 1/166; G08G 1/167; G08G 1/0125; G08G 1/0137; G06F 18/253
See application file for complete search history.

(56) References Cited

U.S. PATENT DOCUMENTS

| | | | |
|---|---|---|---|
| 2018/0365503 A1 | 12/2018 | Xia et al. | |
| 2019/0025841 A1 | 1/2019 | Haynes et al. | |
| 2019/0049970 A1 | 2/2019 | Djuric et al. | |
| 2019/0308620 A1 | 10/2019 | Sapp et al. | |
| 2020/0122588 A1* | 4/2020 | Cserna | B60L 58/12 |

FOREIGN PATENT DOCUMENTS

| | | | | |
|---|---|---|---|---|
| CN | 104867329 A | 8/2015 | | |
| CN | 106981202 A | 7/2017 | | |
| CN | 107697070 A | 2/2018 | | |
| CN | 107919027 A | 4/2018 | | |
| CN | 108639048 A | 10/2018 | | |
| CN | 109285348 A | 1/2019 | | |
| CN | 109670277 A | * 4/2019 | ............ | G06F 30/20 |
| CN | 109976334 A | 7/2019 | | |
| CN | 110103955 A | 8/2019 | | |
| CN | 110111566 A | 8/2019 | | |
| CN | 110164183 A | 8/2019 | | |
| CN | 110796856 A | 2/2020 | | |
| JP | 2004157731 A | 6/2004 | | |

OTHER PUBLICATIONS

The State Intellectual Property Office of the People's Republic of China (SIPO) Office Action 1 for for 201910984614.0 Sep. 3, 2021 13 Pages (including translation).
The World Intellectual Property Organization (WIPO) International Search Report for PCT/CN2020/117384 Dec. 21, 2020 8 Pages (including translation).
Q. Yang et al., "A microscopic traffic simulator for evaluation of dynamic traffic management systems," Transportation Research Part C: Emerging Technologies, vol. 4, No. 3, pp. 113-129, 1996. 17 pages.
L. Ballan et al., "Knowledge transfer for scene-specific motion prediction," In European Conference on Computer Vision, pp. 697-713, Springer, 2016. 17 pages.
N. Lee et al., "Desire: Distant future prediction in dynamic scenes with interacting agents," Proceedings of the IEEE Conference on Computer Vision and Pattern Recognition (CVPR), 2017, pp. 336-345. 10 pages.
A. Sadeghian et al., "CAR-net: Clairvoyant attentive recurrent network," arXiv preprint arXiv:1711.10061, Nov. 28, 2017. 10 pages.
S. Hochreiter et al., "Long short-term memory," Neural computation, 9(8), 1997. 32 pages.
Lu Chi et al., "Deep Steering: Learing End to End Driving Model from Spatial and Temporal Visual Cues", Aug. 12, 2017.
The European Patent Office (EPO) Extended Search Report for EP Application No. 20877235.0 Aug. 4, 2022 14 Pages.

* cited by examiner

Calculate, according to the vehicle traveling information at the traveling moment corresponding to the current feature extraction window and the hidden state information that is outputted by the previous feature extraction window, candidate state information, an input weight of the candidate state information, a forget weight of target state information of the previous feature extraction window, and an output weight of target state information of the current feature extraction window ⟶ S410

Retain the target state information of the previous feature extraction window according to the forget weight, and obtain first intermediate state information ⟶ S420

Retain the candidate state information according to the input weight of the candidate state information, and obtain second intermediate state information ⟶ S430

Obtain the target state information of the current feature extraction window according to the first intermediate state information and the second intermediate state information ⟶ S440

Retain the target state information of the current feature extraction window according to the output weight of the target state information of the current feature extraction window, and obtain the hidden state information of the current feature extraction window ⟶ S450

FIG. 4

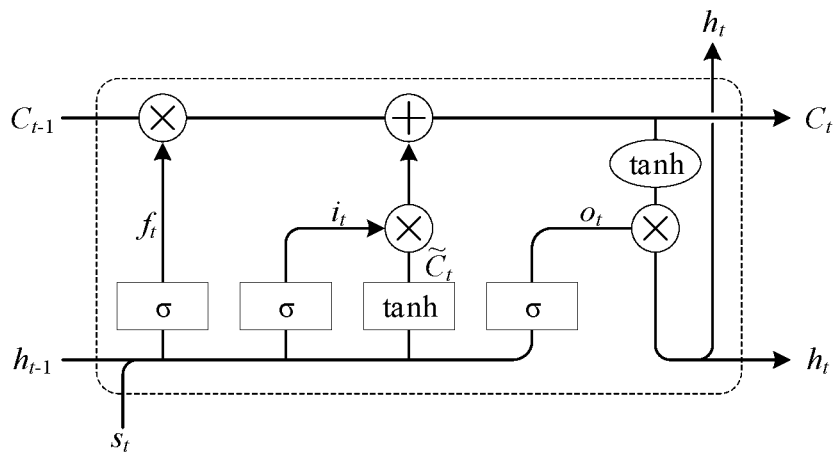

FIG. 5

METHOD FOR AUTOMATIC CONTROL OF VEHICLE AND METHOD FOR TRAINING LANE CHANGE INTENTION PREDICTION NETWORK

RELATED APPLICATIONS

This application is a continuation application of PCT Application No. PCT/CN2020/117384, filed on Sep. 24, 2020, which in turn claims priority to Chinese Patent Application No. 201910984614.0, entitled "VEHICLE LANE CHANGE INTENTION PREDICTION METHOD AND METHOD FOR TRAINING LANE CHANGE INTENTION PREDICTION NETWORK" filed with the China National Intellectual Property Administration on Oct. 16, 2019. The two applications are incorporated herein by reference in their entirety.

FIELD OF THE TECHNOLOGY

The present disclosure relates to the field of artificial intelligence (AI) technologies, and specifically, to a method for automatic control of a vehicle, a method for vehicle lane change intention prediction, a method for training lane change intention prediction network, a apparatus for vehicle lane change intention prediction, an apparatus for vehicle automatic control, an apparatus for training lane change intention prediction network, and an electronic device.

BACKGROUND OF THE DISCLOSURE

People often need to predict a future event, for example, to predict whether it will rain tomorrow, or to predict the production of a harvest. Similarly, when driving a vehicle, a person also subconsciously predicts a behavior of another vehicle, to determine a traveling route of the existing vehicle according to a lane change intention of the vehicle. Based on such predictions, a possible risk of accidents can be avoided to a certain extent.

With the advance and development of sciences and technologies, people begin to research vehicle autonomous driving technologies applicable to the autonomous driving field, so that a vehicle can execute autonomous driving, to free up both hands of the drivers. Autonomous driving not only requires automatic starting, traveling, braking, stopping, and the like, but also requires that a technical means be used for accurately predicting a lane change intention of a nearby vehicle during driving, to replace a prediction behavior of a person during driving, and then adjusting a traveling route according to the lane change intention of the nearby vehicle, to reduce the probability of a traffic accident. Therefore, predicting a lane change intention of a vehicle has become a problem that needs to be resolved urgently in the autonomous driving field.

The information disclosed in the above background part is used only for enhancing the understanding of the background of the present disclosure, and therefore may include information that does not constitute the related art known to a person of ordinary skill in the art.

SUMMARY

One aspect of the present disclosure provides a method for automatic control of a vehicle. The method includes receiving a plurality of types of vehicle traveling information of a target vehicle; inputting the plurality of types of vehicle traveling information of the target vehicle into a lane change intention prediction network, the lane change intention prediction network comprising a plurality of sub-networks being in a one-to-one correspondence with the plurality of types of vehicles, and the lane change intention prediction network being used for predicting a lane change intention of a vehicle in a traveling state; performing, through the sub-networks, feature extraction on the types of vehicle traveling information respectively, and outputting feature extraction results; performing feature fusion on the feature extraction results outputted by the sub-networks, and predicting a lane change intention of the target vehicle according to a feature fusion result; and updating an autonomous driving route of a current vehicle according to the lane change intention of the target vehicle.

Another aspect of the present disclosure provides a method for training lane change intention prediction network. The method includes inputting sample data into a lane change intention prediction network, the sample data comprising a plurality of types of vehicle traveling information and a labeled vehicle lane change intention, the lane change intention prediction network comprising a plurality of sub-networks being in a one-to-one correspondence with the plurality of types of vehicles, and the lane change intention prediction network being used for predicting a lane change intention of a vehicle in a traveling state; performing, through the sub-networks, feature extraction on the types of vehicle traveling information respectively, and outputting feature extraction results; performing feature fusion on the feature extraction results outputted by the sub-networks, and predicting a vehicle lane change intention according to a feature fusion result; and performing parameter adjustment on the lane change intention prediction network according to the vehicle lane change intention and the labeled vehicle lane change intention.

Another aspect of the present disclosure provides an electronic device, including: a processor; and a memory, configured to store instructions executable to the processor, the processor being configured to execute the executable instructions to perform: inputting sample data into a lane change intention prediction network, the sample data comprising a plurality of types of vehicle traveling information and a labeled vehicle lane change intention, the lane change intention prediction network comprising a plurality of sub-networks being in a one-to-one correspondence with the plurality of types of vehicles, and the lane change intention prediction network being used for predicting a lane change intention of a vehicle in a traveling state; performing, through the sub-networks, feature extraction on the types of vehicle traveling information respectively, and outputting feature extraction results; performing feature fusion on the feature extraction results outputted by the sub-networks, and predicting a vehicle lane change intention according to a feature fusion result; and performing parameter adjustment on the lane change intention prediction network according to the vehicle lane change intention and the labeled vehicle lane change intention.

Another aspect of the present disclosure provides a non-transitory computer-readable storage medium, storing a computer program, the computer program, when executed by a processor, implementing any one of the foregoing methods.

BRIEF DESCRIPTION OF THE DRAWINGS

The accompanying drawings herein are included in the specification and form a part of the specification, illustrate embodiments consistent with the present disclosure, and serve to explain the principles of the present disclosure together with the description. Obviously, the accompanying drawings in the following description are merely some embodiments of the present disclosure. For a person of ordinary skill in the art, other accompanying drawings can be obtained based on the accompanying drawings without creative efforts.

FIG. 4 is a schematic flowchart of performing, by a feature extraction window in a sub-network, feature extraction on vehicle traveling information according to an embodiment of the present disclosure.

FIG. 5 is a schematic signal transfer diagram of an LSTM unit according to an embodiment of the present disclosure.

DESCRIPTION OF EMBODIMENTS

Exemplary implementations will now be described more thoroughly with reference to the accompanying drawings. However, the exemplary implementations can be implemented in various forms and are not to be construed as being limited to the examples set forth herein. Rather, the implementations are provided so that the present disclosure can be more comprehensive and complete, and the concepts of the exemplary implementations are fully conveyed to a person skilled in the art. The described features, structures, or characteristics may be combined in one or more implementations in any appropriate method. In the following descriptions, a lot of specific details are provided to give a comprehensive understanding of the implementations of the present disclosure. However, a person skilled in the art is to be aware that, the technical solutions in the present disclosure may be implemented without one or more of the particular details, or another method, component, apparatus, or step may be used. In other cases, well-known technical solutions are not shown or described in detail in order to avoid overwhelming the subject and thus obscuring various aspects of the present disclosure.

In addition, the accompanying drawings are merely exemplary illustrations of the present disclosure and are not necessarily drawn to scale. The same reference numbers in the accompanying drawings represent the same or similar parts, and therefore, repeated descriptions thereof are omitted. Some of the block diagrams shown in the accompanying drawings are functional entities and do not necessarily correspond to physically or logically independent entities. The functional entities may be implemented in the form of software, or implemented in one or more hardware modules or integrated circuits, or implemented in different networks and/or processor apparatuses and/or micro-controller apparatuses.

Figure 1:
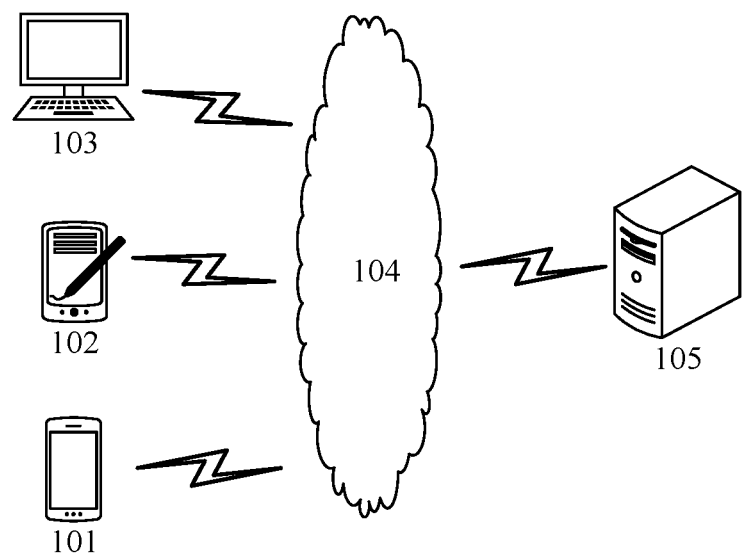
FIG. 1 is a schematic diagram of an exemplary system architecture implementing a method for vehicle lane change intention prediction, a method for automatic control of a vehicle, a method for training lane change intention prediction network, a apparatus for vehicle lane change intention prediction, an apparatus for vehicle automatic control, and an apparatus for training lane change intention prediction network consist with the embodiments of the present disclosure.

FIG. 1 is a schematic diagram of an exemplary system architecture to which a method for vehicle lane change intention prediction, a method for automatic control of a vehicle, a method for training lane change intention prediction network, a apparatus for vehicle lane change intention prediction, an apparatus for vehicle automatic control, and an apparatus for training lane change intention prediction network of the embodiments of the present disclosure are applicable.

As shown in FIG. 1, the system architecture 100 may include one or more of terminal devices 101, 102, and 103, a network 104, and a server 105. The network 104 is a medium configured to provide communication links between the terminal devices 101, 102, and 103, and the server 105. The network 104 may include various connection types, for example, a wired or wireless communication link, or an optical fiber cable. The terminal devices 101, 102, and 103 may be various electronic devices with display screens, including but not limited to, desktop computers, portable computers, smartphones, tablet computers, and the like. It is to be understood that the quantities of terminal devices, networks, and servers in FIG. 1 are merely exemplary. There may be any quantities of terminal devices, networks, and servers according to an implementation requirement. For example, the server 105 may be a server cluster including a plurality of servers.

The vehicle lane change intention prediction method, the method for automatic control of a vehicle, and the method for training lane change intention prediction network provided in the embodiments of the present disclosure are usually performed by the server 105, and correspondingly the apparatus for vehicle lane change intention prediction, the apparatus for vehicle automatic control, and the apparatus for training lane change intention prediction network are usually disposed in the server 105. However, it is easy for a person skilled in the art to understand that, the vehicle lane change intention prediction method, the method for automatic control of a vehicle, and the method for training lane change intention prediction network provided in the embodiments of the present disclosure may alternatively be performed by the terminal devices 101, 102, and 103, and correspondingly the apparatus for vehicle lane change intention prediction, the apparatus for vehicle automatic control, and the apparatus for training lane change intention prediction network may alternatively be disposed in the terminal devices 101, 102, and 103. This is not specially limited in this embodiment.

For example, in an embodiment, the server 105 may receive a plurality of types of vehicle traveling information, and then input the plurality of types of vehicle traveling information into a lane change intention prediction network; perform, through sub-networks, feature extraction on the types of vehicle traveling information respectively; and perform feature fusion on feature extraction results outputted by the sub-networks, and predict a vehicle lane change intention according to a feature fusion result. Moreover, the server 105 may alternatively receive a plurality of types of vehicle traveling information of a target vehicle, and then input the plurality of types of vehicle traveling information of the target vehicle into a lane change intention prediction network; perform, through the sub-networks, feature extraction on the types of vehicle traveling information respectively, and outputting feature extraction results; perform feature fusion on the feature extraction results outputted by the sub-networks, and predict a lane change intention of the target vehicle according to a feature fusion result; and update an autonomous driving route of a current vehicle according to a lane change intention of each target vehicle. However, it is easy for a person skilled in the art to understand that, in addition to updating an autonomous driving route of a current vehicle, a lane change intention predicted in this embodiment of the present disclosure may be further used for, for example, more effectively intercepting the target vehicle. Moreover, the server 105 may alternatively input sample data into a lane change intention prediction network, perform, through sub-networks, feature extraction on the types of vehicle traveling information respectively; and perform feature fusion on the feature extraction results outputted by the sub-networks, and predict a vehicle lane change intention according to a feature fusion result; and perform parameter adjustment on the lane change intention prediction network according to the vehicle lane change intention and the labeled vehicle lane change intention.

Figure 2:
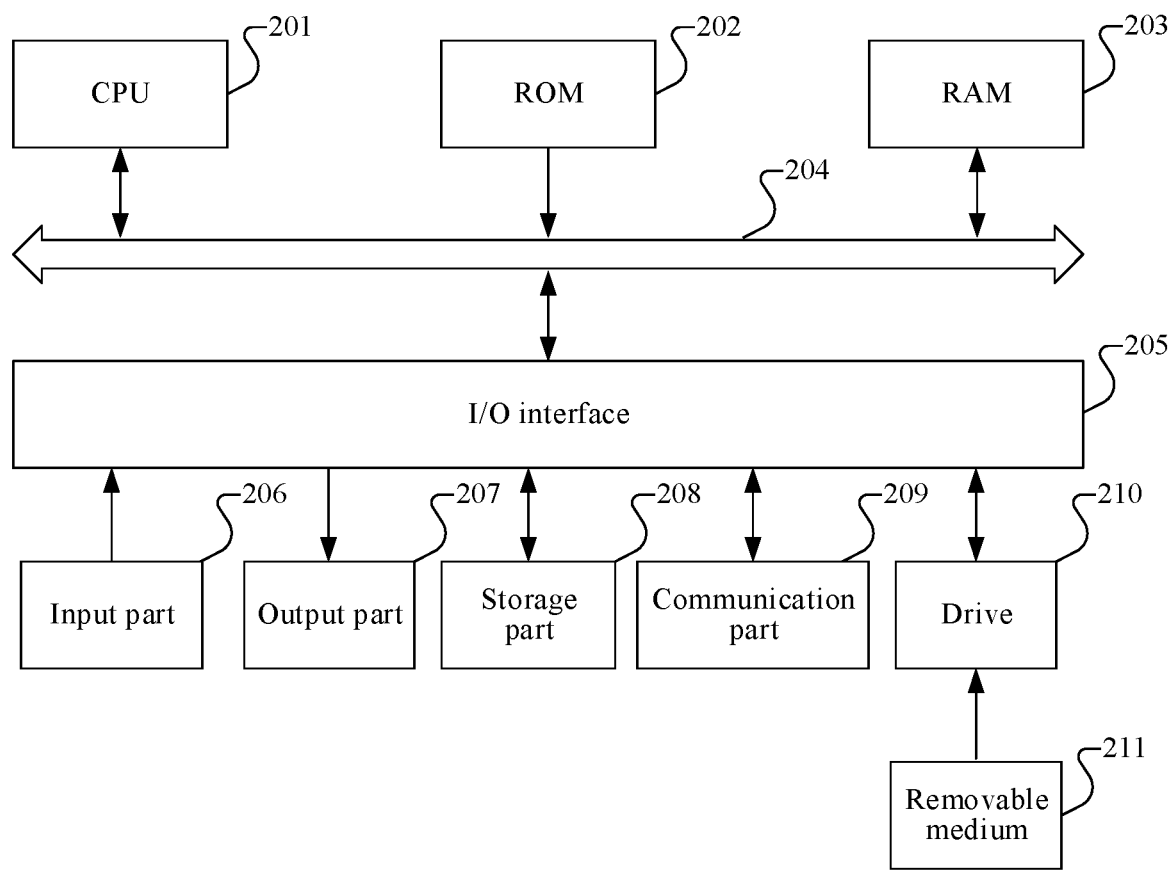
FIG. 2 is a schematic structural diagram of a computer system adapted for implementing an electronic device according to an embodiment of the present disclosure.

FIG. 2 is a schematic structural diagram of a computer system adapted for implementing an electronic device according to an embodiment of the present disclosure. A computer system 200 of the electronic device shown in FIG. 2 is merely an example, and is not to be construed as any limitation on the function and application scope of the embodiments of the present disclosure. As long as computer systems in other structures can implement the embodiments of the present disclosure, it is to be understood that all of the computer systems are included in the present disclosure.

As shown in FIG. 2, the computer system 200 includes a central processing unit (CPU) 201, which can perform various appropriate actions and processing according to a program stored in a read-only memory (ROM) 202 or a program loaded into a random access memory (RAM) 203 from a storage part 208. The RAM 203 further stores various programs and data required for operating the system. The CPU 201, the ROM 202, and the RAM 203 are connected to each other through a bus 204. An input/output (I/O) interface 205 is also connected to the bus 204.

The following components are connected to the I/O interface 205: an input part 206 including a keyboard and a mouse, etc.; an output part 207 including a cathode ray tube (CRT), a liquid crystal display (LCD), and a speaker, etc.; a storage part 208 including hard disk, etc.; and a communication part 209 including a network interface card such as an LAN card or a modem, etc. The communication part 209 performs communication processing by using a network such as the Internet. A drive 210 is also connected to the I/O interface 205 as needed. A removable medium 211, such as a magnetic disk, an optical disc, a magneto-optical disk, or a semiconductor memory, is installed on the drive 210 as required, so that a computer program read from the removable medium is installed into the storage part 208 as required.

In some embodiments, the computer system 200 may further include an AI processor. The AI processor is configured to process computing operations related to ML.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a method similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

ML is a multi-field inter-discipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

AI is applied to the driving field. By relying on cooperation of artificial intelligence, visual computing, a radar, a monitoring apparatus, and the global positioning system, a computer is enabled to autonomously and safely operate without any human proactive operation. An autonomous driving system mainly includes environment perception, decision making coordination, and control execution. Similar to operating of a human brain, data perceived by a sensor of an autonomous driving automobile each forms a driving situation map cluster at intervals, to form operating memory of the vehicle, where long-term memory includes a driving map and various types of driving a-priori knowledge, and a motive is a path requirement of intelligent driving, and may be conveyed to the vehicle through man-machine interaction. Through interaction among the short-term memory, and long-term memory, and the motive, the vehicle may perform autonomous decision making, and transfer a control instruction to an execution mechanism, to complete an entirely autonomous driving process.

The technical solutions in the embodiments of the present disclosure are described below in detail.

When driving a vehicle, a person subconsciously predicts a behavior of another vehicle, and determines a traveling route of the existing vehicle according to the behavior of another vehicle, thereby avoiding some traffic accidents. However, external information that a person can capture is limited. When some less law-abiding drivers are encountered, or vehicles are in a dead zone, it becomes less easy to predict their behaviors. Moreover, attention of a driver is very difficult to concentrate for a long time, or even is distracted by some external factors sometimes, but traffic accidents usually occur at these moments.

Therefore, regardless of a vehicle that needs to be controlled by a person or a future unmanned vehicle, it is particularly important to be capable of accurately predicting a behavior about to occur in a vehicle on a road surface. In different scenarios, a vehicle has different possible driving intentions. Therefore, the applicant considers that it is necessary to design a method that is better applicable to intention prediction in different scenarios. Autonomous driving automobiles are equipped with various sensors such as a microwave radar and a laser radar. Therefore, the autonomous driving automobiles have detection and perception capabilities far exceeding those of human beings, and can comprehensively detect a surrounding environment without interruption. By using this point, an autonomous driving automobile can own a better prediction capability than that of a human being, so that the autonomous driving automobile owns a safe, comfortable, and cooperative driving capability.

Currently, prediction of a vehicle lane change intention is usually determined by defining lane change types based on some rules. For example, a lane change intention of a vehicle is determined according to a preset condition met by a distance between a front vehicle and a rear vehicle of the existing vehicle; or a lane change intention of a vehicle is predicted according to a preset condition met by a vehicle head direction of the vehicle. However, in each of the foregoing exemplary methods, some relatively valuable information around the vehicle is neglected. As a result, prediction of a lane change intention of the target vehicle is relatively rigid and accuracy cannot meet a further automation requirement of vehicle driving.

Figure 3:
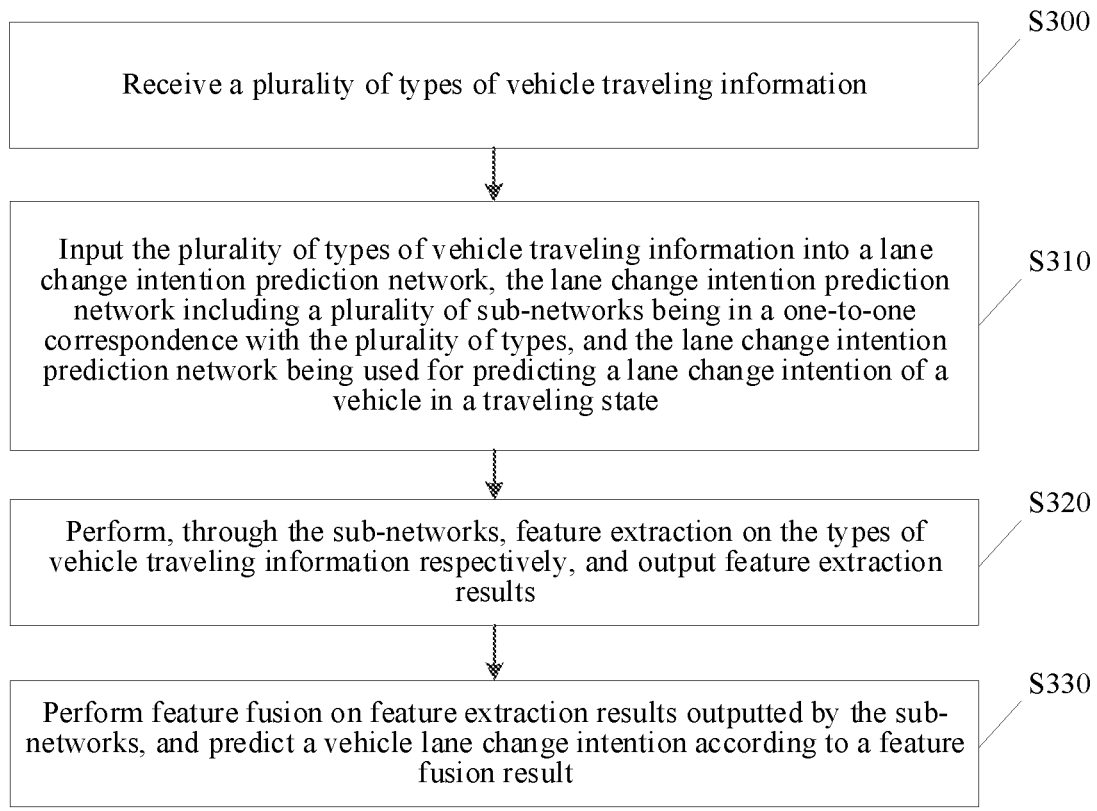
FIG. 3 is a schematic flowchart of a method for vehicle lane change intention prediction according to an embodiment of the present disclosure.

Based on the foregoing posed problems, this embodiment provides a method for vehicle lane change intention prediction. The vehicle lane change intention prediction method is applicable to the foregoing server 105, and also applicable to one or more of the foregoing terminal devices 101, 102, and 103, and this is not specially limited in this embodiment. Referring to FIG. 3, the vehicle lane change intention prediction method may include the following step S300 to step S330:

Step S300: Receive a plurality of types of vehicle traveling information.

Step S310: Input the plurality of types of vehicle traveling information into a lane change intention prediction network, the lane change intention prediction network including a plurality of sub-networks being in a one-to-one correspondence with the plurality of types of vehicles, and the lane change intention prediction network being used for predicting a lane change intention of a vehicle in a traveling state.

Step S320: Perform, through the sub-networks, feature extraction on the types of vehicle traveling information respectively, and output feature extraction results.

Step S330: Perform feature fusion on feature extraction results outputted by the sub-networks, and predict a vehicle lane change intention according to a feature fusion result.

In the vehicle lane change intention prediction method provided in this embodiment of the present disclosure, a plurality of types of vehicle traveling information may be inputted into a lane change intention prediction network, the lane change intention prediction network including a plurality of sub-networks being in a one-to-one correspondence with the plurality of types of vehicles, for example, a sub-network for processing vehicle state information corresponding to each traveling moment, a sub-network for processing interaction information of a nearby vehicle, and a sub-network for processing road network information, and the lane change intention prediction network being used for predicting a lane change intention of a vehicle in a traveling state; then feature extraction may be performed on the types of vehicle traveling information through the sub-networks respectively; and feature fusion is performed on feature extraction results outputted by the sub-networks, and a vehicle lane change intention such as keeping straight, leftward lane change, or rightward lane change is predicted according to a feature fusion result. According to the description of the foregoing solution, in an aspect, the present disclosure can resolve the vehicle lane change intention prediction problem, and then may assist the autonomous driving vehicle in determining a vehicle lane change intention in a surrounding road environment, to provide a basis for autonomous driving decision making of the existing vehicle; and in another aspect, compared with a conventional case that different scenarios correspond to different prediction methods, this embodiment of the present disclosure can apply the lane change intention prediction network to a plurality of complex scenarios without designing excessive preset rules, thereby improving a generalized applicability of the lane change intention prediction network.

Below, the foregoing steps in this embodiment are described in more detail.

In step S310, the plurality of types of vehicle traveling information are inputted into a lane change intention prediction network, the lane change intention prediction network including a plurality of sub-networks being in a one-to-one correspondence with the plurality of types of vehicles, and the lane change intention prediction network being used for predicting a lane change intention of a vehicle in a traveling state.

In this embodiment, the vehicle traveling information is used for representing traveling states of the target vehicle at different moments. The plurality of types of vehicle traveling information are used for representing traveling states of the target vehicle at different moments from various sides. Moreover, each sub-network is used for processing vehicle traveling information of a type corresponding to the sub-network, the sub-network may be a long short-term memory (LSTM) network, a gated recurrent unit (GRU) network, another recurrent neural network (RNN), or a bidirectional LSTM (BiLSTM) network, and is not limited in this embodiment of the present disclosure.

The LSTM is a time recurrent neural network, and may be used for resolving a long-term dependency problem existing in a usual recurrent neural network (RNN), and a core idea of the LSTM is to retain a state within a specific time through a storage unit. The GRU is an optimized variant of the LSTM network. The RNN is a type of recursive neural network in which sequence data is used as an input, recursion is performed in a sequence evolution direction, and all nodes (or recurrent units) are in a chain connection. The BiLSTM is formed by combining a forward LSTM and a backward LSTM.

In this embodiment, the plurality of types of vehicle traveling information may include vehicle state information, interaction information of a nearby vehicle, and road network information that correspond to each traveling moment. The vehicle state information is used for representing a current traveling state of the target vehicle; and the interaction information of a nearby vehicle is used for representing a relationship between the target vehicle and a surrounding vehicle, for example, relative locations and relative speeds, and the road network information is used for representing road information and lane information of a region in which the target vehicle travels. Moreover, the plurality of types of vehicle traveling information may further include information corresponding to a traffic emergency, for example, information indicating that a traffic accident occurs at 300 meters ahead and a lane A and a lane B are occupied. For example, the vehicle state information may include current location coordinates of the target vehicle, a transverse distance to a center line of a lane, or an orientation of a vehicle head and speed information; the interaction information of a nearby vehicle may include location information of a preset quantity of surrounding vehicles or relative speed information of the surrounding vehicles and the target vehicle; and the road network information may include lane information, a traffic signal, an intersection, or a road definition, and the road network information corresponds to a region to which a current location of the target vehicle belongs.

Moreover, a traveling moment is used for representing a moment at which vehicle traveling information is collects, and as the target vehicle continuously travels, the target vehicle corresponds to different vehicle traveling information at different traveling moments.

In this embodiment, the vehicle state information, the interaction information of a nearby vehicle, and the road network information are three types of vehicle traveling information. Different traveling moments correspond to different vehicle state information, interaction information of a nearby vehicle, and road network information. Therefore, there may be a plurality of pieces of vehicle state information, a plurality of pieces of interaction information of a nearby vehicle, and a plurality of pieces of road network information. That is, a traveling moment t−n corresponds to vehicle state information, interaction information of a nearby vehicle, and road network information, a traveling moment t corresponds to vehicle state information, interaction information of a nearby vehicle, and road network information, and a traveling moment t+n corresponds to vehicle state information, interaction information of a nearby vehicle, and road network information, where t and n are positive integers. Therefore, there may alternatively be only one piece of vehicle state information, one piece of interaction information of a nearby vehicle, and one piece of road network information, for example, a current value during prediction, which is not limited in the present disclosure.

In this embodiment, current location coordinates of the target vehicle may be represented by using (x, y, z), where y is a longitudinal coordinate in a Frenet coordinate system, and is used for representing an advancing direction of the target vehicle and a longitudinal displacement of the target vehicle on a traveling road; x is a transverse coordinate in the Frenet coordinate system, and is used for representing a transverse displacement of the target vehicle on the traveling road, and a transverse axis is a vector perpendicular to a normal vector of the advancing direction; and z is a height coordinate in the Frenet coordinate system, and is used for representing a slope of the road on which the target vehicle travels. Additionally, the Frenet coordinate system is used for describing a location of the target vehicle relative to the road.

In this embodiment, the speed information may include one or more of a transverse speed, a longitudinal speed, an angular speed, a transverse acceleration, and a longitudinal acceleration, and is not limited in this embodiment of the present disclosure.

In this embodiment, location information of a preset quantity of (for example, eight) surrounding vehicles may be location information of vehicles in the shape of "Union Jack" around the target vehicle, that is, location information of vehicles that are in front of, behind, on the left of, on the right of, on the front left of, on the front right of, on the rear left of, and on the rear right of the target vehicle, where the location information may include coordinates of the surrounding vehicles and locations of the surrounding vehicles relative to the target vehicle.

In this embodiment, the road network information may be information in a high precision map, and is a precise three-dimensional representation of a road network. The lane information may include a lane quantity of a road on which the target vehicle is currently traveling, a lane width, and the like, the traffic signal may include traffic sign information, a color meaning of a traffic light, and the like, information corresponding to the intersection may include a junction shape representing the intersection, for example, a junction of three roads, a cross junction, or a T-junction, and the road definition may include the name of the road on which the target vehicle is currently traveling and the like, which is not limited in this embodiment of the present disclosure.

The high precision map is also referred to as a high definition (HD) map, and is a map specially serving unmanned driving. Different from a conventional navigation map, in addition to road-level navigation information, the high precision map can further provide lane-level navigation information, and is higher than the conventional navigation map in both information richness and information precision.

In this embodiment, the vehicle lane change intention prediction method may further include the following step: obtaining the vehicle state information and the interaction information of a nearby vehicle through one or more of a GPS, an inertial measurement unit, a laser radar, and a video camera used for performing vision positioning, which is not limited in this embodiment of the present disclosure. A gyroscope is disposed in the inertial navigation unit.

In this embodiment, the vehicle lane change intention prediction method further includes the following step:
  determining a current location of the target vehicle and a region to which the current location belongs, and determining road network information corresponding to the region to which the current location belongs.

In this embodiment, a method of determining a current location of the target vehicle and a region to which the current location belongs may be specifically: determining longitude and latitude of the target vehicle through the GPS; and then, determining zone information such as nation, province, city, and district corresponding to the target vehicle according to the longitude and latitude, where the zone information may be used for representing a region to which the target vehicle belongs.

In this embodiment, the road network information may be a high precision map of a district to which the target vehicle belongs, and may alternatively be a high precision map of a city to which the target vehicle belongs, and may alternatively be a high precision map of a province to which the target vehicle belongs, and may alternatively be a high precision map of a nation to which the target vehicle belongs, which is not limited in this embodiment of the present disclosure.

Accordingly, by implementing this embodiment of the present disclosure, corresponding road network information can be loaded according to the location of the target vehicle, thereby reducing waste of computing resources, and improving the resource utilization.

In step S320, feature extraction is performed on the types of vehicle traveling information respectively through the sub-networks, and feature extraction results are outputted.

In this embodiment, the lane change intention prediction network may include an LSTM sub-network used for processing the vehicle state information, an LSTM sub-network used for processing the interaction information of a nearby vehicle, and an LSTM sub-network used for processing the road network information. Each sub-network includes a plurality of feature extraction windows, and the feature extraction windows correspond to feature extraction at different traveling moments, that is, each LSTM sub-network includes a plurality of feature extraction windows, which may alternatively be understood as a plurality of feature extraction units. A method in which each feature extraction unit performs feature extraction is a feature extraction method in a flowchart of performing, by a feature extraction window in a sub-network, feature extraction on vehicle traveling information shown in FIG. 4.

In this embodiment, the performing, through sub-networks, feature extraction on the types of vehicle traveling information respectively includes:

sequentially performing, for each sub-network, feature extraction on the vehicle traveling information in a traveling moment order according to a plurality of feature extraction windows in each of the sub-networks, where a feature extraction process for one feature extraction window includes:

generating, according to vehicle traveling information at a traveling moment corresponding to a current feature extraction window and hidden state information that is outputted by a previous feature extraction window, hidden state information of the current feature extraction window.

For example, if the LSTM sub-network used for processing the vehicle state information includes 3 feature extraction windows, and for the vehicle state information in the vehicle traveling information, there are the vehicle state information corresponding to the moment t−2, the vehicle state information corresponding to the moment t−1, and the vehicle state information corresponding to the moment t, the vehicle state information corresponding to the moment t−2 is inputted into a first feature extraction window, the vehicle state information corresponding to the moment t−1 is inputted into a second feature extraction window, and the vehicle state information corresponding to the moment t is inputted into a third feature extraction windows according to a logic order of the feature extraction windows.

Further, FIG. 4 is a schematic flowchart of performing, by a feature extraction window in a sub-network, feature extraction on vehicle traveling information according to an embodiment of the present disclosure. As shown in FIG. 4, the generating, according to vehicle traveling information at a traveling moment corresponding to a current feature extraction window and hidden state information that is outputted by a previous feature extraction window, hidden state information of the current feature extraction window includes step S410 to step S450:

Step S410: Calculate, according to the vehicle traveling information at the traveling moment corresponding to the current feature extraction window and the hidden state information that is outputted by the previous feature extraction window, candidate state information, an input weight of the candidate state information, a forget weight of target state information of the previous feature extraction window, and an output weight of target state information of the current feature extraction window.

Step S420: Retain the target state information of the previous feature extraction window according to the forget weight, and obtain first intermediate state information.

Step S430: Retain the candidate state information according to the input weight of the candidate state information, and obtain second intermediate state information.

Step S440: Obtain the target state information of the current feature extraction window according to the first intermediate state information and the second intermediate state information.

Step S450: Retain the target state information of the current feature extraction window according to the output weight of the target state information of the current feature extraction window, and obtain the hidden state information of the current feature extraction window.

In this embodiment, FIG. 5 is a schematic signal transfer diagram of an LSTM unit according to an embodiment of the present disclosure. The LSTM unit may be understood as the foregoing feature extraction window, and the LSTM unit usually includes a forget gate, an input gate, and an output gate. In this embodiment, one of the foregoing feature extraction processes may be performed through one LSTM unit.

In step S410, candidate state information, an input weight of the candidate state information, a forget weight of target state information of the previous feature extraction window, and an output weight of target state information of the current feature extraction window are calculated according to the vehicle traveling information at the traveling moment corresponding to the current feature extraction window and the hidden state information that is outputted by the previous feature extraction window. Details are as follows:

The forget gate is used for determining how much information is discarded from target state information of a previous feature extraction process, and therefore the forget weight is used for representing a weight of unforgotten (that is, retained) target state information of the previous feature extraction process; and the forget weight may be substantially a weight matrix. Exemplarily, the vehicle traveling information at the traveling moment t−n corresponding to the current feature extraction window and hidden state information of the previous feature extraction process may be encoded through an activation function used for representing the forget gate, and mapped to values between 0 and 1, to obtain a forget weight of the target state information of the previous feature extraction process. 0 represents being completely discarded, and 1 represents being completely retained. For example, the forget weight $f_t$ of the target state information of the previous feature extraction process may be obtained through calculation according to the following formula:

$$f_t = \sigma(W_f[h_{t-1}, S_t] + b_f)$$

where $h_{t-1}$ represents the hidden state information of the previous feature extraction process, $S_t$ represents the vehicle traveling information at the traveling moment t-n corresponding to the current feature extraction window, σ represents the activation function: Sigmoid function, $W_f$ and $b_f$ represent parameters of the Sigmoid function in the forget gate, and $[h_{t-1}, S_t]$ represents a combination of $h_{t-1}$ and $S_t$, and may alternatively be understood as splicing $h_{t-1}$ and $S_t$. An output range of the Sigmoid function is (0, 1), and in a binary classification task, the sigmoid function outputs an event probability.

The input gate is used for determining how much information is important and needs to be retained in the currently inputted vehicle traveling information. Exemplarily, the vehicle traveling information at the traveling moment t-n corresponding to the current feature extraction window and hidden state information of the previous feature extraction process may be encoded through an activation function used for representing the input gate, to obtain candidate state information and an input weight of the candidate state information, where the input weight of the candidate state information is used for determining how much new information in the candidate state information may be added to the target state information.

For example, the candidate state information $\tilde{C}_t$ may be obtained through calculation according to the following formula:

$$\tilde{C}_t = \tan h(W_c \cdot [h_{t-1}, S_t] + b_c])$$

where tan h indicates that the activation function is a hyperbolic tangent function, and $W_c$ and $b_c$ represent parameters of the tan h function in the input gate.

Moreover, the input weight $i_t$ of the candidate state information may be obtained through calculation according to the following formula:

$$i_t = \sigma(W_i \cdot [h_{t-1}, S_t] + b_i)$$

where σ represents the activation function: Sigmoid function, and $W_i$ and $b_i$ represent parameters of the Sigmoid function in the input gate.

The output gate is used for determining which information is to be included in hidden state information outputted to a next LSTM unit. Exemplarily, the vehicle traveling information at the traveling moment t-n corresponding to the current feature extraction window and hidden state information of the previous feature extraction process may be encoded through an activation function used for representing the output gate, to obtain an output weight of the target state information of the current feature extraction process. For example, the candidate state information $o_t$ may be obtained through calculation according to the following formula:

$$o_t = \sigma(W_o \cdot [h_{t-1}, S_t] + b_o)$$

where σ represents the activation function: Sigmoid function, and $W_o$ and $b_o$ represent parameters of the Sigmoid function in the output gate.

In step S420, the target state information of the previous feature extraction window is retained according to the forget weight, and first intermediate state information is obtained. For example, the obtained first intermediate state information may be $f_t \otimes C_{t-1}$, where $C_{t-1}$ represents the target state information of the previous feature extraction process.

In step S430, the candidate state information is retained according to the input weight of the candidate state information, and second intermediate state information is obtained. For example, the obtained second intermediate state information may be $i_t \otimes \tilde{C}_t$.

In step S440, the target state information of the current feature extraction window is obtained according to the first intermediate state information and the second intermediate state information. For example, the target state information of the current feature extraction process may be $C_t = f_t \otimes C_{t-1} + i_t \otimes \tilde{C}_t$.

In step S450, the target state information of the current feature extraction window is retained according to the output weight of the target state information of the current feature extraction window, and the hidden state information of the current feature extraction window is obtained. For example, the hidden state information of the current feature extraction process may be $h_t = o_t \otimes \tan h(C_t)$.

Accordingly, by implementing this embodiment of the present disclosure with reference to the flowchart of performing, by a feature extraction window in a sub-network, feature extraction on vehicle traveling information shown in FIG. 4 and the signal transfer diagram of an LSTM unit shown in FIG. 5, a lane change intention of the target vehicle can be predicted in consideration of an effect of a surrounding vehicle on the target vehicle. Accordingly, the determined lane change intention of the target vehicle is more accurate. Then, a driving route of the existing vehicle may be better determined, thereby reducing the probability of a traffic accident.

In step S330, feature fusion is performed on feature extraction results outputted by the sub-networks, and a vehicle lane change intention is predicted according to a feature fusion result.

In this embodiment, the feature extraction result may be a feature vector, for example, {A1, A2, A3}, and a method of performing feature fusion on the feature extraction results outputted by the sub-network may be specifically: combining feature vectors (for example, {A1, A2, A3}, {B1, B2, B3}, and {C1, C2, C3}) outputted by the sub-networks, and obtaining anew feature vector (for example, {A1, A2, A3, B1, B2, B3, C1, C2, C3}), to fusing the feature extraction results.

In this embodiment, the vehicle lane change intention may be keeping straight, leftward lane change, rightward lane change, or the like, and is not limited in this embodiment of the present disclosure.

In an embodiment of the present disclosure, the performing feature fusion on the feature extraction results outputted by the sub-networks includes:

splicing the feature extraction results outputted by the sub-networks, to implement the feature fusion on the feature extraction results.

Further, the splicing the feature extraction results outputted by the sub-networks, to implement the feature fusion on the feature extraction results includes:

performing, according to preset weights, weighting processing on the feature extraction results outputted by the sub-networks, and splicing weighting processing results, to implement the feature fusion on the feature extraction results.

For example, the preset weights may be 3:2:1, and if the feature extraction results outputted by the sub-networks are (1, 1, 1), (2, 2, 2), and (3, 3, 3), weighting processing results may be (3, 3, 3), (4, 4, 4), and (3, 3, 3), and (3, 3, 3, 4, 4, 4, 3, 3, 3) may be obtained by splicing the weighting processing results. Accordingly, feature fusion may be implemented for the feature extraction results.

Accordingly, by implementing this embodiment of the present disclosure, the feature extraction results can be fused according to importance levels through the preset weights.

The determined feature fusion result facilitates prediction of the lane change intention of the target vehicle, to improve prediction accuracy.

In an embodiment of the present disclosure, the predicting a vehicle lane change intention according to a feature fusion result includes:

determining, according to the feature fusion result, a distribution of probabilities that the target vehicle belongs to types of lane change intentions; and predicting the vehicle lane change intention according to the probability distribution, where the vehicle lane change intention includes vehicle state information of the target vehicle at a future moment.

In this embodiment, a method of determining, according to the feature fusion result, a distribution of probabilities that the target vehicle belongs to types of lane change intentions may be:

inputting the feature fusion result into classifiers corresponding to the types lane change intentions, performing normalization processing on values outputted by the classifiers through a normalized exponential function (softmax), and obtaining a distribution of probabilities (for example, 0.013, 0.265, 0.722) that the target vehicle belongs to the types of lane change intentions, where softmax is used for compressing a vector into another vector, so that each element in the probability distribution is in a range of (0, 1), and a sum of all elements in the probability distribution is 1. An expression corresponding to softmax is:

$$\sigma(z_j) = \frac{e^{z_j}}{\sum_{k=1}^{K} e^{z_k}}$$

where an input of the softmax function is a value $z_j$ outputted by a classifier, $j=1, \ldots, K$, K is used for representing a quantity of classifiers, and may alternatively be understood as a quantity of outputted values, and K is a positive integer.

In this embodiment, the probability distribution may be represented as a vector, and a method of predicting the vehicle lane change intention according to the probability distribution may be specifically:

determining a lane change intention sequence y(t), y(t+1), ..., y(t+n) of the target vehicle according to the vector corresponding to the probability distribution, where y(t) is used for representing a lane change intention of the target vehicle at the moment t, y(t+1) is used for representing a lane change intention of the target vehicle at the moment t+1, y(t+n) is used for representing a lane change intention of the target vehicle at the moment t+n, and n is a positive integer.

Accordingly, by implementing this embodiment of the present disclosure, a lane change intention of the target vehicle at a future moment can be predicted, to determine a autonomous driving route of the existing vehicle according to the lane change intention of the target vehicle. During lane change intention prediction, an effect caused by a vehicle around the target vehicle on the target vehicle is considered. Therefore, accuracy of the determined lane change intention is higher, and determining the driving route of the existing vehicle according to the lane change intention can reduce the probability of a traffic accident, to improve safety and reliability of the autonomous driving vehicle.

Accordingly, implementing the vehicle lane change intention prediction method shown in FIG. 3 can resolve the vehicle lane change intention prediction problem, and then may assist the autonomous driving vehicle in determining a vehicle lane change intention in a surrounding road environment, to provide a basis for autonomous driving decision making of the existing vehicle. Compared with a conventional case that different scenarios correspond to different prediction methods, this embodiment of the present disclosure can apply the lane change intention prediction network to a plurality of complex scenarios without designing excessive preset rules, thereby improving a generalized applicability of the lane change intention prediction network.

Figure 6:
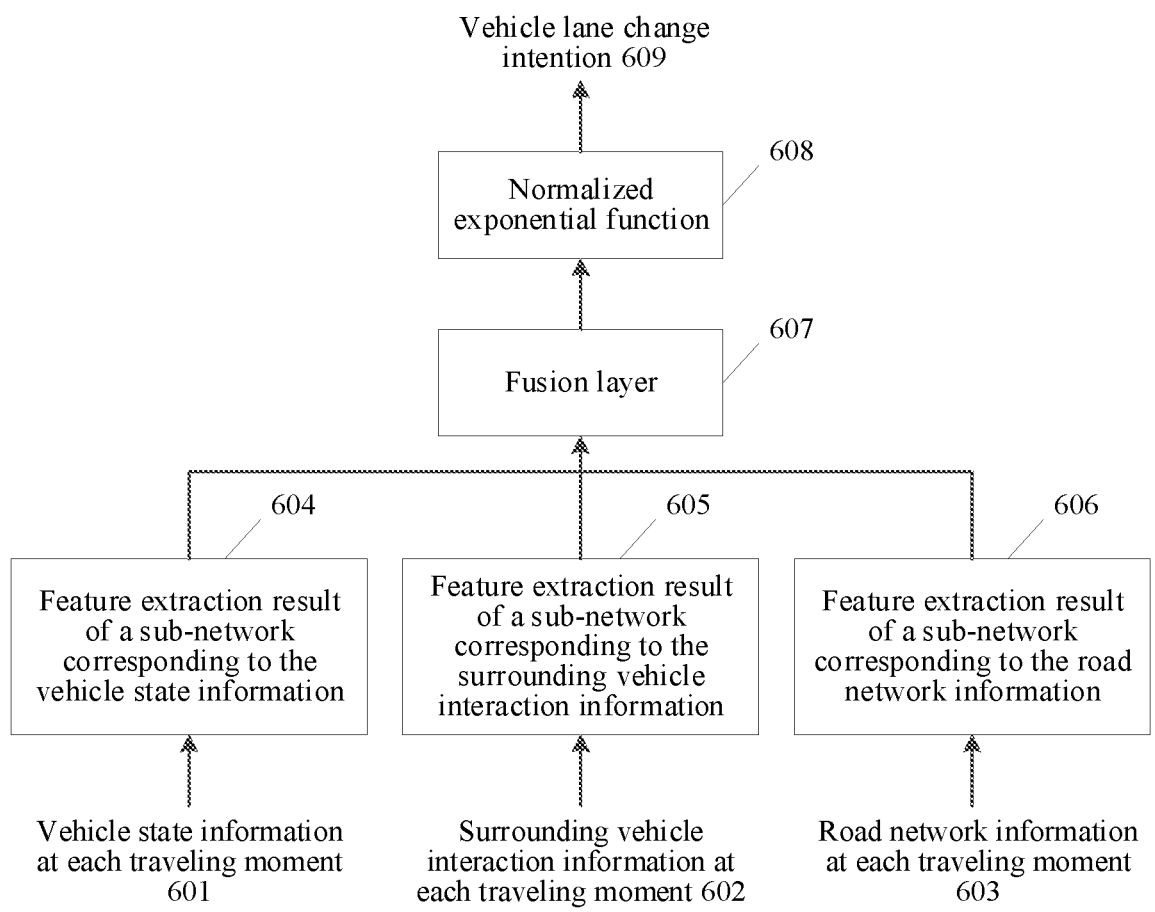
FIG. 6 is a schematic architectural diagram of a lane change intention prediction network according to an embodiment of the present disclosure.

FIG. 6 is a schematic architectural diagram of a lane change intention prediction network according to an embodiment of the present disclosure. As shown in FIG. 6, the architectural diagram of the lane change intention prediction network includes vehicle state information 601 at each traveling moment, interaction information of a nearby vehicle 602 at each traveling moment, road network information 603 at each traveling moment, a feature extraction result 604 of a sub-network corresponding to the vehicle state information, a feature extraction result 605 of a sub-network corresponding to the interaction information of a nearby vehicle, a feature extraction result 606 of a sub-network corresponding to the road network information, a fusion layer 607, a normalized exponential function 608, and a vehicle lane change intention 609.

Specifically, the vehicle state information 601 at each traveling moment may be inputted into the feature extraction result 604 of the sub-network corresponding to the vehicle state information, the interaction information of a nearby vehicle 602 at each traveling moment may be inputted into the feature extraction result 605 of the sub-network corresponding to the interaction information of a nearby vehicle, and the road network information 603 at each traveling moment may be inputted into the feature extraction result 606 of the sub-network corresponding to the road network information. Then, the feature extraction result 604 of the sub-network corresponding to the vehicle state information, the feature extraction result 605 of the sub-network corresponding to the interaction information of a nearby vehicle, and the feature extraction result 606 of the sub-network corresponding to the road network information may be fused through the fusion layer 607, to obtain a feature fusion result, and probability distributions of types of lane change intentions are determined through the normalized exponential function 608 and the feature fusion result, where a lane change intention with a highest probability may be determined as the vehicle lane change intention 609 (for example, keeping straight, leftward lane change, or rightward lane change). The vehicle lane change intention 609 may be outputted in a sequence form, for example, the foregoing y(t), y(t+1), ..., y(t+n).

Accordingly, implementing this embodiment of the present disclosure with reference to the architectural diagram of the lane change intention prediction network shown in FIG. 6 can reduce complexity of construct a lane change intention prediction network based on a deep convolutional neural network, a recurrent neural network, and an adversarial neural network in the existing technology, improve utilization of computing resources, and improve prediction efficiency and prediction accuracy of a vehicle lane change intention.

Figure 7:
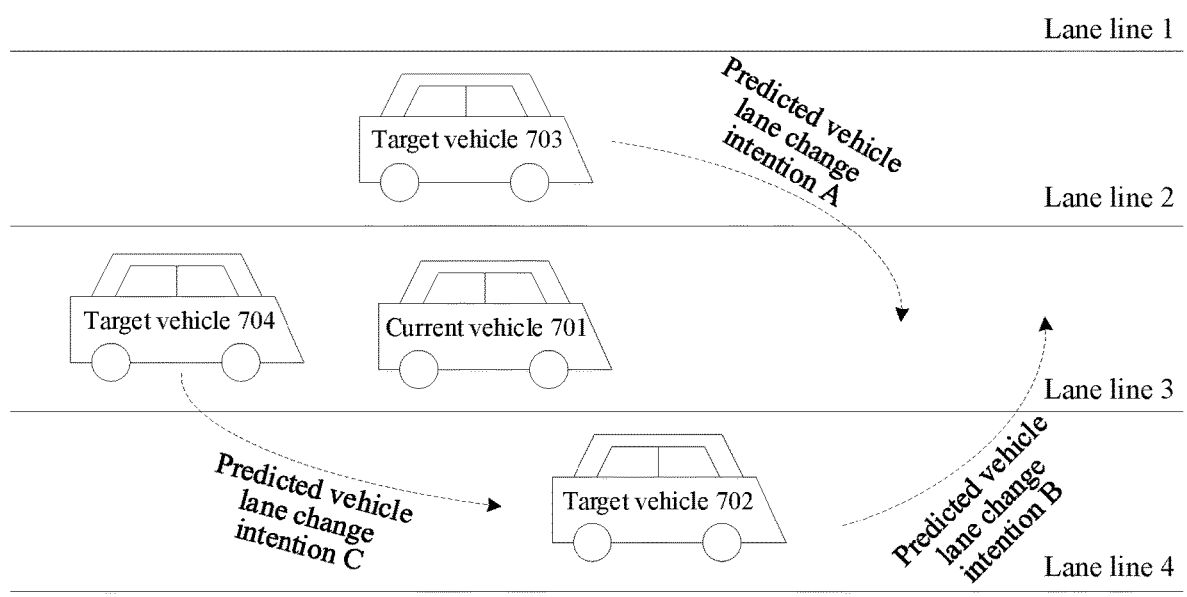
FIG. 7 is a schematic diagram of a vehicle lane change intention prediction result according to an embodiment of the present disclosure.

FIG. 7 is a schematic diagram of a vehicle lane change intention prediction result according to an embodiment of the present disclosure. As shown in FIG. 7, the schematic diagram of the prediction result schematically shows a current vehicle 701 (that is, the foregoing existing vehicle), a target vehicle 702, a target vehicle 703, and a target vehicle 704. The target vehicle 703 travels between a lane line 1 and a lane line 2, the current vehicle 701 and the target vehicle 704 travel between the lane line 2 and a lane line 3, the current vehicle 701 is in front of the target vehicle 704, and the target vehicle 702 travels between the lane line 3 and a lane line 4.

According to this embodiment of the present disclosure, it can be determined that vehicle lane change intentions of the target vehicle 702, the target vehicle 703, and the target vehicle 704 are respectively a predicted vehicle lane change intention B, a predicted vehicle lane change intention A, and a predicted vehicle lane change intention C. Specifically, it can be known according to the predicted vehicle lane change intention A that the target vehicle 703 prepares to change from a lane between the lane line 1 and the lane line 2 to a lane between the lane line 2 and the lane line 3, it can be known according to the predicted vehicle lane change intention B that the target vehicle 702 prepares to change from a lane between the lane line 3 and the lane line 4 to the lane between the lane line 2 and the lane line 3, and it can be known according to the predicted vehicle lane change intention C that the target vehicle 704 prepares to change from the lane between the lane line 2 and the lane line 3 to the lane between the lane line 3 and the lane line 4, and an autonomous driving route of the current vehicle 701 may be determined according to the target vehicle 702, the target vehicle 703, and the target vehicle 704. Accordingly, a lane change intention of the target vehicle can be predicted in consideration of an effect of a surrounding vehicle on the target vehicle. Accordingly, the determined lane change intention of the target vehicle is more accurate. Then, a driving route of the existing vehicle may be better determined, thereby reducing the probability of a traffic accident.

Figure 8:
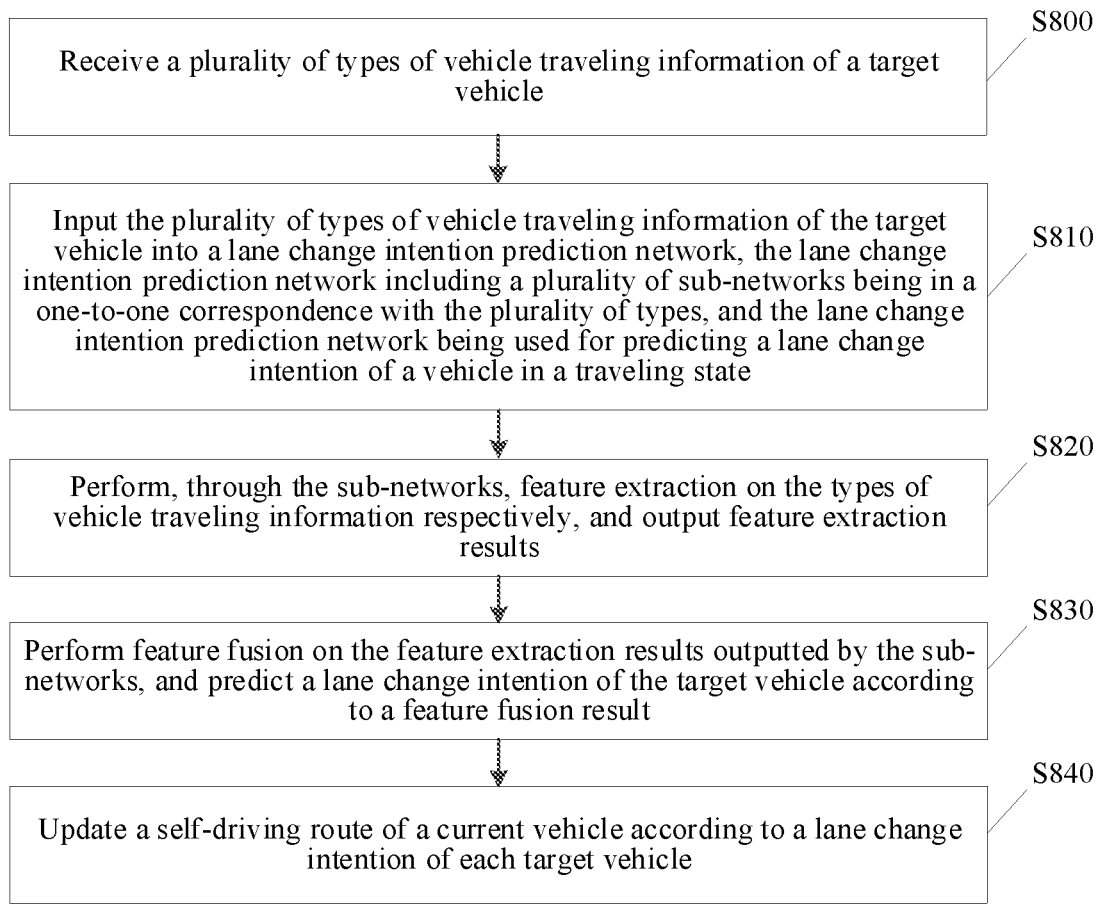
FIG. 8 is a schematic flowchart of a method for automatic control of a vehicle according to an embodiment of the present disclosure.

Moreover, this embodiment provides a method for automatic control of a vehicle. The method for automatic control of a vehicle is applicable to the foregoing server 105, and also applicable to one or more of the foregoing terminal devices 101, 102, and 103, and this is not specially limited in this embodiment. Referring to FIG. 8, the method for automatic control of a vehicle may include the following step S800 to step S840:

Step S800: Receive a plurality of types of vehicle traveling information of a target vehicle.

Step S810: Input the plurality of types of vehicle traveling information of the target vehicle into a lane change intention prediction network, the lane change intention prediction network including a plurality of sub-networks being in a one-to-one correspondence with the plurality of types of vehicles, and the lane change intention prediction network being used for predicting a lane change intention of a vehicle in a traveling state.

Step S820: Perform, through the sub-networks, feature extraction on the types of vehicle traveling information respectively, and output feature extraction results.

Step S830: Perform feature fusion on the feature extraction results outputted by the sub-networks, and predict a lane change intention of the target vehicle according to a feature fusion result.

Step S840: Update an autonomous driving route of a current vehicle according to a lane change intention of each target vehicle.

Specifically, the foregoing plurality of types of vehicle traveling information are equivalent to the plurality of types of vehicle traveling information in FIG. 3. According to an embodiment of the present disclosure, after the lane change intention of the target vehicle is determined, the autonomous driving route of the current vehicle can be continuously updated, to reflect real-time performance of driving route update.

Moreover, step S810 to step S830 are similar to step S310 to step S330. The details of the functions of these steps are not repeated herein again.

Accordingly, by implementing the method for automatic control of a vehicle shown in FIG. 8, a lane change intention of the target vehicle can be predicted in consideration of an effect of a surrounding vehicle on the target vehicle. Accordingly, the determined lane change intention of the target vehicle is more accurate. Then, a driving route of the existing vehicle may be better determined, thereby reducing the probability of a traffic accident.

Figure 9:
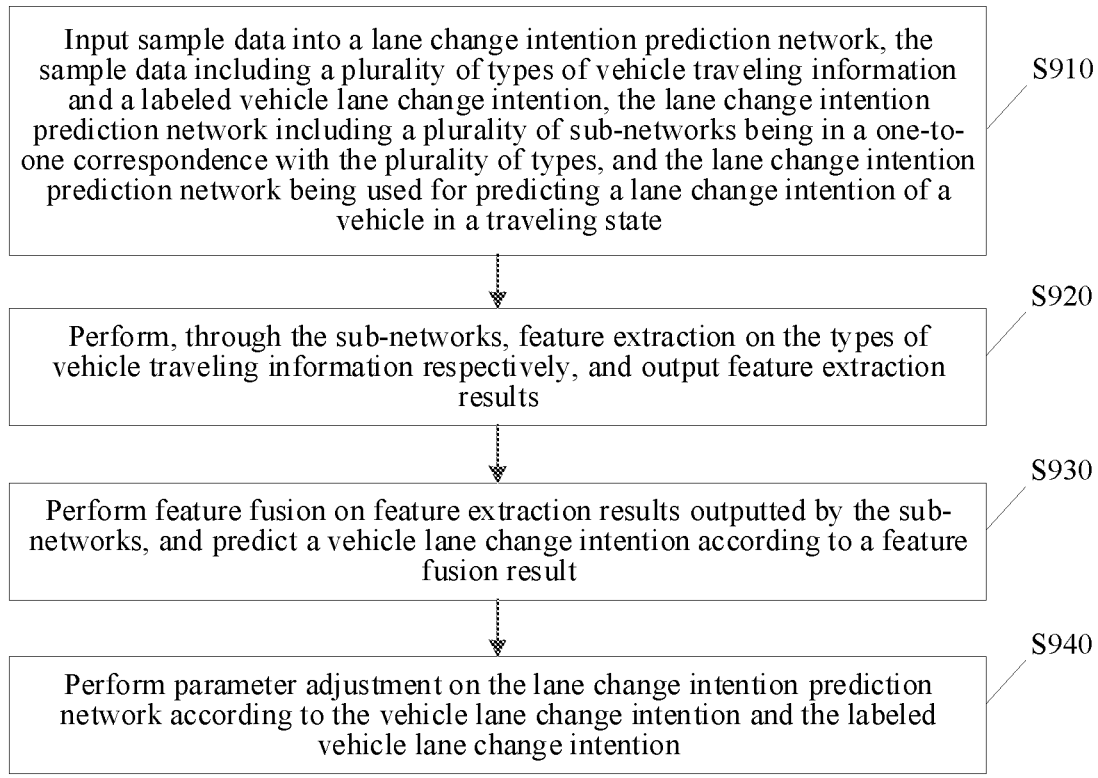
FIG. 9 is a schematic flowchart of a method for training lane change intention prediction network according to an embodiment of the present disclosure.

Moreover, this embodiment provides a method for training lane change intention prediction network. The method for training lane change intention prediction network is applicable to the foregoing server 105, and also applicable to one or more of the foregoing terminal devices 101, 102, and 103, and this is not specially limited in this embodiment. Referring to FIG. 9, the method for training lane change intention prediction network may include the following step S910 to step S940:

Step S910: Input sample data into a lane change intention prediction network, the sample data including a plurality of types of vehicle traveling information and a labeled vehicle lane change intention, the lane change intention prediction network including a plurality of sub-networks being in a one-to-one correspondence with the plurality of types of vehicles, and the lane change intention prediction network being used for predicting a lane change intention of a vehicle in a traveling state.

Step S920: Perform, through the sub-networks, feature extraction on the types of vehicle traveling information respectively, and output feature extraction results.

Step S930: Perform feature fusion on feature extraction results outputted by the sub-networks, and predict a vehicle lane change intention according to a feature fusion result.

Step S940: Perform parameter adjustment on the lane change intention prediction network according to the vehicle lane change intention and the labeled vehicle lane change intention.

In this embodiment, step S910 to step S940 are used for representing a lane change intention prediction network training process, and a plurality of lane change intention prediction networks may be obtained by performing training through the foregoing training process. Moreover, the sample data may be data in a training set.

Further, after step S940, the method may further include the following step:

determining prediction accuracies of the lane change intention prediction networks after the parameter adjustment according to a validation set, and determining, from the lane change intention prediction networks according to the prediction accuracies, a lane change intention prediction network corresponding to a current driving scenario, where the lane change intention prediction network is used for performing lane change intention prediction on the target vehicle. The validation set also includes a plurality of types of vehicle traveling information and labeled vehicle lane change intentions, and the validation set, and the training set may have an intersection set or may have no intersection set, which is not limited in this embodiment of the present disclosure.

In this embodiment, a method of performing parameter adjustment on the lane change intention prediction network according to the vehicle lane change intention and the labeled vehicle lane change intention may be specifically:

calculating a loss function between the predicted vehicle lane change intention and a labeled vehicle lane change intention, and performing parameter adjustment on the lane change intention prediction network according to the loss function, until a loss function value is less than a preset loss function value.

Moreover, step S910 to step S930 are similar to step S310 to step S330. The details of the functions of these steps are not repeated herein again.

Accordingly, implementing the method for training lane change intention prediction network shown in FIG. 9 can reduce an extent of dependency of the vehicle lane change intention prediction on a preset rule, thereby improving training efficiency for a lane change intention prediction model.

Figure 10:
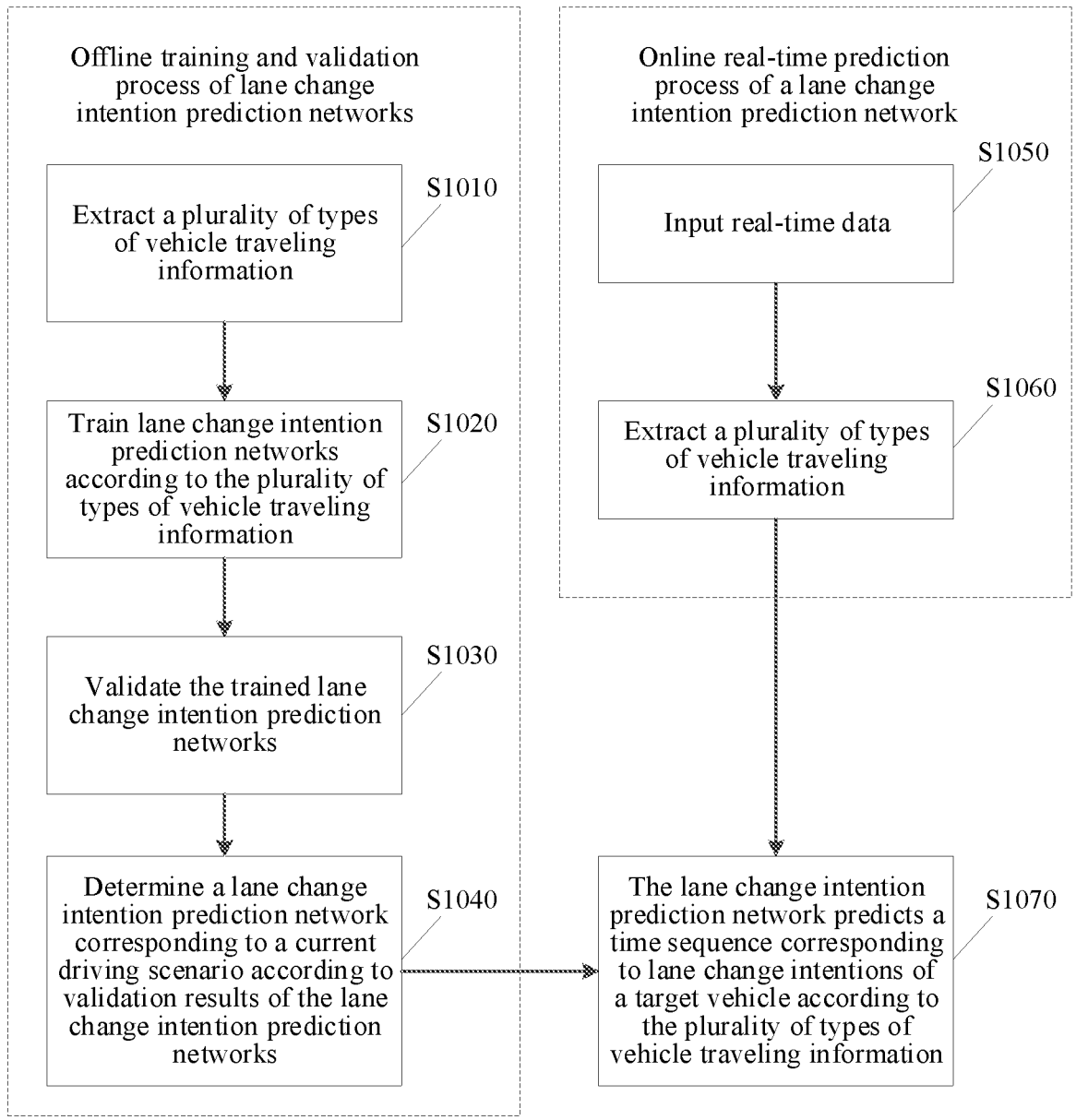
FIG. 10 is a schematic flowchart of a lane change intention prediction network training process combined with a prediction process according to an embodiment of the present disclosure.

FIG. 10 is a schematic flowchart of a lane change intention prediction network training process combined with a prediction process according to an embodiment of the present disclosure. As shown in FIG. 10, the lane change intention prediction network training process combined with a prediction process may include the following step S1010 to step S1070:

An offline training and validation process of lane change intention prediction networks includes step S1010 to step S1040:

Step S1010: Extract a plurality of types of vehicle traveling information.

Step S1020: Train lane change intention prediction networks according to the plurality of types of vehicle traveling information.

Step S1030: Validate the trained lane change intention prediction networks.

Step S1040: Determine a lane change intention prediction network corresponding to a current driving scenario according to validation results of the lane change intention prediction networks.

An online real-time prediction process of a lane change intention prediction network includes step S1050 to step S1070:

Step S1050: Input real-time data.

Step S1060: Extract a plurality of types of vehicle traveling information.

Step S1070: The lane change intention prediction network predicts a time sequence corresponding to lane change intentions of a target vehicle according to the plurality of types of vehicle traveling information.

In the offline training and validation process of lane change intention prediction networks, the plurality of types of vehicle traveling information may be first extracted, and then the lane change intention prediction networks are trained according to the plurality of types of vehicle traveling information. For a specific training process, reference is made to step S910 to step S940 and a corresponding embodiment. Then, the trained lane change intention prediction networks may be validated, to determine the lane change intention prediction network corresponding to the current driving scenario according to validation results (for example, prediction accuracies) of the lane change intention prediction networks.

In the online real-time prediction process of a lane change intention prediction network, real-time data may be first inputted, where the real-time data may be autonomous driving vehicle information captured by an in-vehicle sensor, and then the plurality of types of vehicle traveling information may be extracted from the autonomous driving vehicle information, so that the lane change intention prediction network predicts the time sequence corresponding to the lane change intentions of the target vehicle according to the plurality of types of vehicle traveling information. For a specific prediction method, reference is made to steps shown in FIG. 3 and a corresponding embodiment, and details are not repeated herein.

Accordingly, implementing this embodiment of the present disclosure with reference to the flowchart shown in FIG. 10 can resolve the vehicle lane change intention prediction problem, and then may assist the autonomous driving vehicle in determining a vehicle lane change intention in a surrounding road environment, to provide a basis for autonomous driving decision making of the existing vehicle. Compared with a conventional case that different scenarios correspond to different prediction methods, this embodiment of the present disclosure can apply the lane change intention prediction network to a plurality of complex scenarios without designing excessive preset rules, thereby improving a generalized applicability of the lane change intention prediction network.

Figure 11:
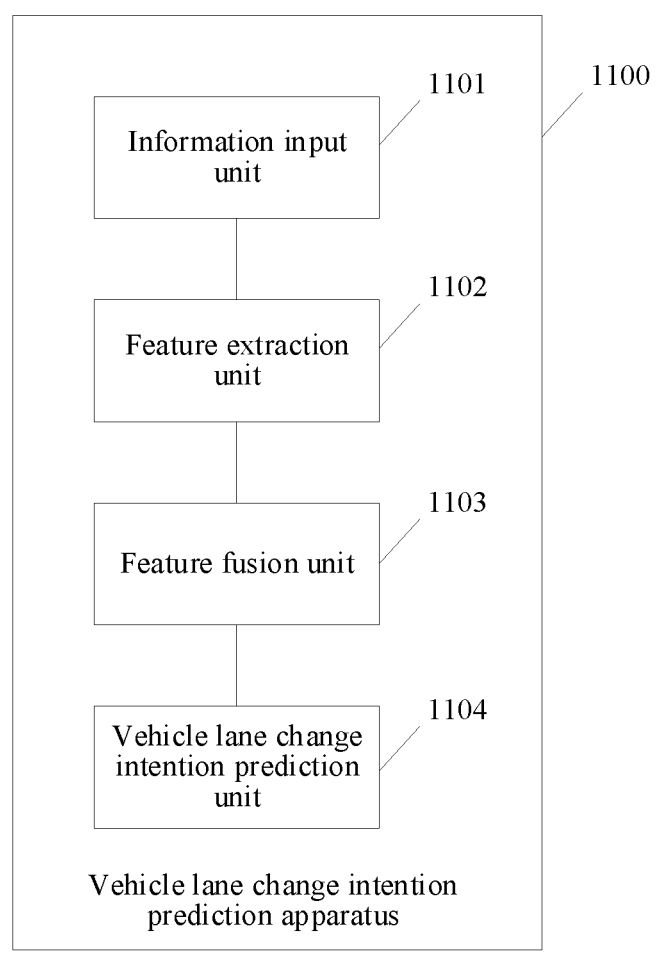
FIG. 11 is a schematic structural block diagram of an apparatus for vehicle lane change intention prediction according to an embodiment of the present disclosure.

Further, in this embodiment, an apparatus for vehicle lane change intention prediction is further provided. The apparatus for vehicle lane change intention prediction is applicable to a server or a terminal device. Referring to FIG. 11, the apparatus for vehicle lane change intention prediction 1100 may include an information input unit 1101, a feature extraction unit 1102, a feature fusion unit 1103, and a vehicle lane change intention prediction unit 1104, the information input unit 1101 being configured to receive a plurality of types of vehicle traveling information;

the information input unit 1101 being configured to input the plurality of types of vehicle traveling information into a lane change intention prediction network, the lane change intention prediction network including a plurality of sub-networks being in a one-to-one correspondence with the plurality of types of vehicles, and the lane change intention prediction network being used for predicting a lane change intention of a vehicle in a traveling state;

the feature extraction unit 1102 being configured to perform, through the sub-networks, feature extraction on the types of vehicle traveling information respectively, and output feature extraction results;

the feature fusion unit 1103 being configured to perform feature fusion on the feature extraction results outputted by the sub-networks; and the vehicle lane change intention prediction unit 1104 being configured to predict a vehicle lane change intention according to a feature fusion result.

The plurality of types of vehicle traveling information include vehicle state information, interaction information of a nearby vehicle, and road network information that correspond to each traveling moment. The vehicle state information includes one or more of current location coordinates of the target vehicle, a transverse distance to a center line of a lane, an orientation of a vehicle head, and speed information; the interaction information of a nearby vehicle includes one or more of location information of a preset quantity of surrounding vehicles and relative speed information of the surrounding vehicles and the target vehicle; and the road network information includes one or more of lane information, a traffic signal, an intersection, and a road definition.

Accordingly, implementing the apparatus for vehicle lane change intention prediction shown in FIG. 11 can resolve the vehicle lane change intention prediction problem, and then may assist the autonomous driving vehicle in determining a vehicle lane change intention in a surrounding road environment, to provide a basis for autonomous driving decision making of the existing vehicle. Compared with a conventional case that different scenarios correspond to different prediction methods, this embodiment of the present disclosure can apply the lane change intention prediction network to a plurality of complex scenarios without designing excessive preset rules, thereby improving a generalized applicability of the lane change intention prediction network.

In an embodiment of the present disclosure, the apparatus for vehicle lane change intention prediction 1100 may further include a road network information determining unit (not shown).

The road network information determining unit is configured to determine a current location of the target vehicle and a region to which the current location belongs, and determine road network information corresponding to the region to which the current location belongs.

Accordingly, by implementing the embodiment, corresponding road network information can be loaded according to the location of the target vehicle, thereby reducing waste of computing resources, and improving the resource utilization.

In an embodiment of the present disclosure, a method of performing, by the feature extraction unit 1102 through the sub-networks, feature extraction on the types of vehicle traveling information respectively may be specifically:

sequentially performing, by the feature extraction unit 1102, feature extraction on the vehicle traveling information in a traveling moment order according to a plurality of feature extraction windows in a sub-network, where a feature extraction process for one feature extraction window includes:

generating, by the feature extraction unit 1102 according to vehicle traveling information at a traveling moment corresponding to a current feature extraction window and hidden state information that is outputted by a previous feature extraction window, hidden state information of the current feature extraction window.

Further, the generating, by the feature extraction unit 1102 according to vehicle traveling information at a traveling moment corresponding to a current feature extraction window and hidden state information that is outputted by a previous feature extraction window, hidden state information of the current feature extraction window includes:

calculating, by the feature extraction unit 1102 according to the vehicle traveling information at the traveling moment corresponding to the current feature extraction window and the hidden state information that is outputted by the previous feature extraction window, candidate state information, an input weight of the candidate state information, a forget weight of target state information of the previous feature extraction window, and an output weight of target state information of the current feature extraction window;

retaining, by the feature extraction unit 1102, the target state information of the previous feature extraction window according to the forget weight, and obtaining first intermediate state information;

retaining, by the feature extraction unit 1102, the candidate state information according to the input weight of the candidate state information, and obtaining second intermediate state information;

obtaining, by the feature extraction unit 1102, the target state information of the current feature extraction window according to the first intermediate state information and the second intermediate state information; and retaining, by the feature extraction unit 1102, the target state information of the current feature extraction window according to the output weight of the target state information of the current feature extraction window, and obtaining the hidden state information of the current feature extraction window.

Accordingly, by implementing the embodiment, a lane change intention of the target vehicle can be predicted in consideration of an effect of a surrounding vehicle on the target vehicle. Accordingly, the determined lane change intention of the target vehicle is more accurate. Then, a driving route of the existing vehicle may be better determined, thereby reducing the probability of a traffic accident.

In an embodiment of the present disclosure, a method of performing, by the feature fusion unit 1103, feature fusion on the feature extraction results outputted by the sub-networks may be specifically:

splicing, by the feature fusion unit 1103, the feature extraction results outputted by the sub-networks, to implement the feature fusion on the feature extraction results.

Further, a method of splicing, by the feature fusion unit 1103, the feature extraction results outputted by the sub-networks, to implement the feature fusion on the feature extraction results may be specifically:

performing, by the feature fusion unit 1103 according to preset weights, weighting processing on the feature extraction results outputted by the sub-networks, and splicing weighting processing results, to implement the feature fusion on the feature extraction results.

Accordingly, by implementing the embodiment, the feature extraction results can be fused according to importance levels through the preset weights. The determined feature fusion result facilitates prediction of the lane change intention of the target vehicle, to improve prediction accuracy.

In an embodiment of the present disclosure, a method of predicting, by the vehicle lane change intention prediction unit 1104, a vehicle lane change intention according to a feature fusion result may be specifically:

determining, by the vehicle lane change intention prediction unit 1104 according to the feature fusion result, a distribution of probabilities that the target vehicle belongs to types of lane change intentions; and predicting, by the vehicle lane change intention prediction unit 1104, the vehicle lane change intention according to the probability distribution, where the vehicle lane change intention includes vehicle state information of the target vehicle at a future moment.

Accordingly, by implementing the embodiment, a lane change intention of the target vehicle at a future moment can be predicted, to determine a autonomous driving route of the existing vehicle according to the lane change intention of the target vehicle. During lane change intention prediction, an effect caused by a vehicle around the target vehicle on the target vehicle is considered. Therefore, accuracy of the determined lane change intention is higher, and determining the driving route of the existing vehicle according to the lane change intention can reduce the probability of a traffic accident, to improve safety and reliability of the autonomous driving vehicle.

Since the functional modules of the apparatus for vehicle lane change intention prediction in the embodiment of the present disclosure correspond to the steps in the embodiment of the above vehicle lane change intention prediction method, for details not disclosed in the apparatus embodiment of the present disclosure, refer to the embodiment of the vehicle lane change intention prediction method of the present disclosure.

Figure 12:
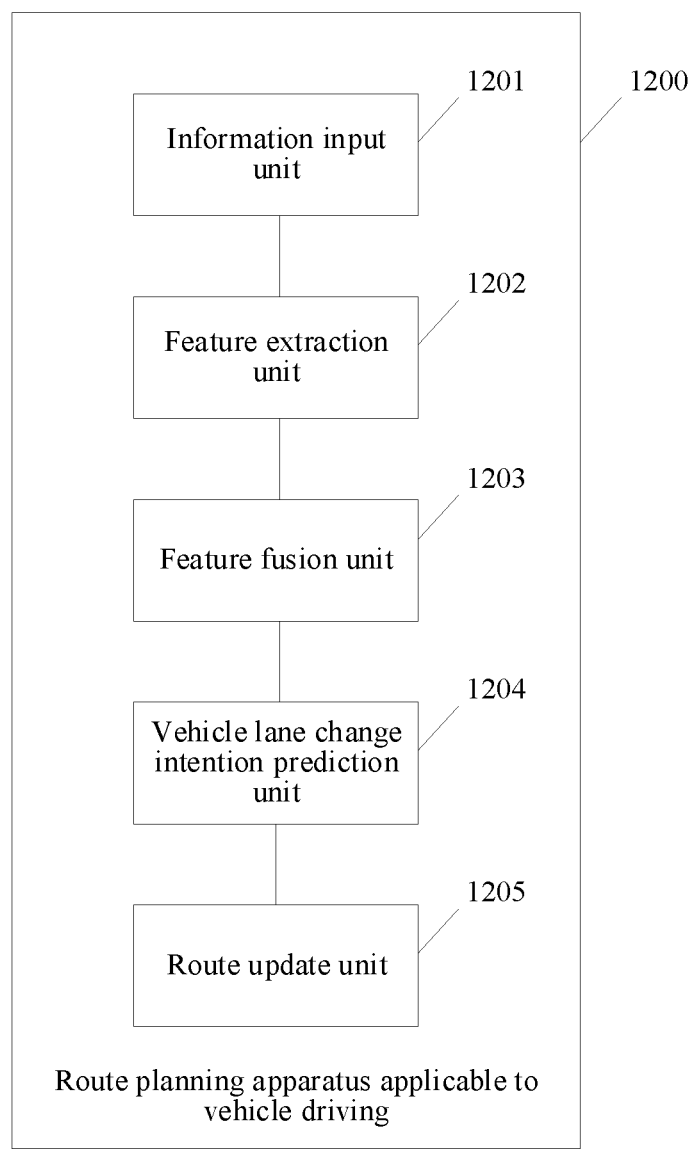
FIG. 12 is a schematic structural block diagram of an apparatus for vehicle automatic control according to an embodiment of the present disclosure.

Furthermore, in this embodiment, an apparatus for vehicle automatic control is further provided. The apparatus for vehicle automatic control is applicable to a server or a terminal device. Referring to FIG. 12, the apparatus for vehicle automatic control 1200 may include an information input unit 1201, a feature extraction unit 1202, a feature fusion unit 1203, a vehicle lane change intention prediction unit 1204, and a route update unit 1205, the information input unit 1201 being configured to receive a plurality of types of vehicle traveling information of a target vehicle, and input the plurality of types of vehicle traveling information of the target vehicle into a lane change intention prediction network, the lane change intention prediction network including a plurality of sub-networks being in a one-to-one correspondence with the plurality of types of vehicles, and the lane change intention prediction network being used for predicting a lane change intention of a vehicle in a traveling state;

the feature extraction unit 1202 being configured to perform, through the sub-networks, feature extraction on the types of vehicle traveling information respectively, and output feature extraction results;

the feature fusion unit 1203 being configured to perform feature fusion on the feature extraction results outputted by the sub-networks;

the vehicle lane change intention prediction unit 1204 being configured to predict a lane change intention of the target vehicle according to a feature fusion result; and the route update unit 1205 being configured to update an autonomous driving route of a current vehicle according to a lane change intention of each target vehicle.

Accordingly, by implementing the apparatus for vehicle automatic control shown in FIG. 12, a lane change intention of the target vehicle can be predicted in consideration of an effect of a surrounding vehicle on the target vehicle. Accordingly, the determined lane change intention of the target vehicle is more accurate. Then, a driving route of the existing vehicle may be better determined, thereby reducing the probability of a traffic accident.

Since the functional modules of the apparatus for vehicle automatic control in the embodiment of the present disclosure correspond to the steps in the embodiment of the above method for automatic control of a vehicle, for details not disclosed in the apparatus embodiment of the present disclosure, refer to the embodiment of the method for automatic control of a vehicle of the present disclosure.

Figure 13:
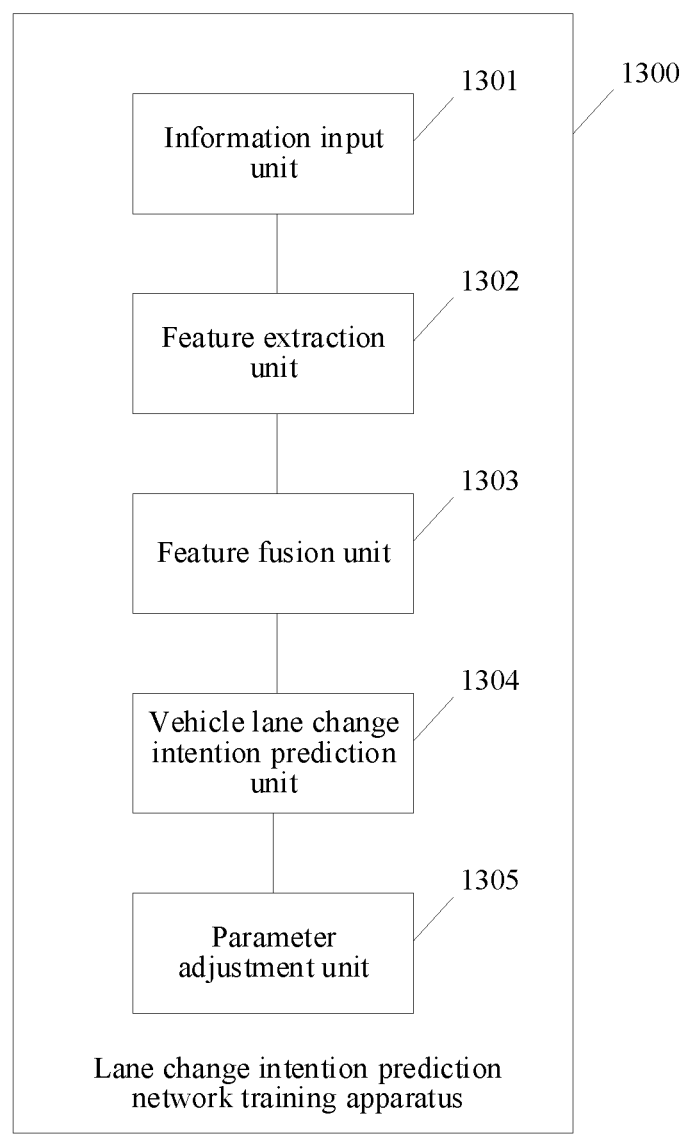
FIG. 13 is a schematic structural block diagram of an apparatus for training lane change intention prediction network according to an embodiment of the present disclosure.

Furthermore, in this embodiment, an apparatus for training lane change intention prediction network is further provided. The apparatus for training lane change intention prediction network is applicable to a server or a terminal device. Referring to FIG. 13, the apparatus for training lane change intention prediction network 1300 may include an information input unit 1301, a feature extraction unit 1302, a feature fusion unit 1303, a vehicle lane change intention prediction unit 1304, and a parameter adjustment unit 1305, the information input unit 1301 being configured to input sample data into a lane change intention prediction network, the sample data including a plurality of types of vehicle traveling information and a labeled vehicle lane change intention, the lane change intention prediction network including a plurality of sub-networks being in a one-to-one correspondence with the plurality of types of vehicles, and the lane change intention prediction network being used for predicting a lane change intention of a vehicle in a traveling state;

the feature extraction unit 1302 being configured to perform, through the sub-networks, feature extraction on the types of vehicle traveling information respectively, and output feature extraction results;

the feature fusion unit 1303 being configured to perform feature fusion on the feature extraction results outputted by the sub-networks;

the vehicle lane change intention prediction unit 1304 being configured to predict a vehicle lane change intention according to a feature fusion result; and the parameter adjustment unit 1305 being configured to perform parameter adjustment on the lane change intention prediction network according to the vehicle lane change intention and the labeled vehicle lane change intention.

Accordingly, implementing the apparatus for training lane change intention prediction network shown in FIG. 13 can reduce an extent of dependency of the vehicle lane change intention prediction on a preset rule, thereby improving training efficiency for a lane change intention prediction model.

Since the functional modules of the apparatus for training lane change intention prediction network in the embodiment of the present disclosure correspond to the steps in the embodiment of the above method for training lane change intention prediction network, for details not disclosed in the apparatus embodiment of the present disclosure, refer to the embodiment of the method for training lane change intention prediction network of the present disclosure.

Although a plurality of modules or units of a device configured to perform actions are discussed in the foregoing detailed description, such division is not mandatory. In practice, according to the implementations of the present disclosure, the features and functions of two or more modules or units described above may be embodied in one module or unit. On the contrary, the features and functions of one module or unit described above may be further divided to be embodied by a plurality of modules or units.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

The computer-readable medium shown in the present disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination of the above. More specifically, the computer-readable storage medium may include, for example, but is not limited to, an electrical connection having one or more wires, a portable computer disk, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium including or storing a program, and the program may be used by or in combination with an instruction execution system, apparatus, or device. In the present disclosure, the computer-readable signal medium may include a data signal included in a baseband or propagated as a part of a carrier, the data signal carrying computer-readable program code. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code included in the computer-readable medium may be transmitted by using any suitable medium, including but not limited to, wireless transmission, a wire, a cable, radio frequency (RF) or the like, or any other suitable combination thereof.

Flowcharts and block diagrams in the drawings illustrate architectures, functions, and operations that may be implemented by using the system, the method, and the computer program product according to the various embodiments of the present disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The units or modules described in the embodiments of the present disclosure may be implemented as a software program, or may be implemented in a hardware component, and the described units or modules may also be disposed in a processor. Names of the units do not constitute a limitation on the units or modules in a specific case. Particularly, according to an embodiment of the present disclosure, the processes described above by referring to the flowcharts may be implemented as computer software programs. For example, the embodiments of this application include a computer program product, including a computer program carried on a computer-readable medium. The computer program includes program code for performing the method shown in the flowchart. In such an embodiment, by using the communication part 209, the computer program may be downloaded and installed from a network, and/or installed from the removable medium 211. When the computer program is executed by the CPU 201, various functions defined in the method and apparatus of this application are executed.

After considering the specification and practicing the present disclosure, a person skilled in the art can easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the technology. The specification and the embodiments are considered as exemplary only, and a true scope and spirit of the present disclosure are pointed out by the following claims.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A method for automatic control of a vehicle, performed by an electronic device, the method comprising:
    receiving a plurality of types of vehicle traveling information of a target vehicle;
    inputting the plurality of types of vehicle traveling information of the target vehicle into a lane change intention prediction network, the lane change intention prediction network comprising a plurality of sub-networks being in a one-to-one correspondence with the plurality of types of vehicles, the lane change intention prediction network being used for predicting a lane change intention of a vehicle in a traveling state, each of the sub-networks comprises a plurality of feature extraction windows, and the feature extraction windows correspond to feature extraction at different traveling moments;
    sequentially performing, through each of the sub-networks, feature extraction on the types of vehicle traveling information in a traveling moment order according to the plurality of feature extraction windows in each of the sub-networks, and outputting feature extraction results;
    performing feature fusion on the feature extraction results outputted by the sub-networks, and predicting a lane change intention of the target vehicle according to a feature fusion result; and
    updating an autonomous driving route of a current vehicle according to the lane change intention of the target vehicle.

2. The method according to claim 1, wherein the plurality of types of vehicle traveling information comprise vehicle state information, interaction information of a nearby vehicle, and road network information that corresponds to each traveling moment.

3. The method according to claim 2, wherein
    the vehicle state information comprises at least one of current location coordinates of the target vehicle, a transverse distance to a center line of a lane, an orientation of a vehicle head, and speed information;
    the interaction information of a nearby vehicle comprises at least one of location information of a preset quantity of surrounding vehicles and relative speed information of the surrounding vehicles and the target vehicle; and
    the road network information comprises at least one of lane information, a traffic signal, an intersection, and a road definition.

4. The method according to claim 3, wherein the road network information corresponds to a region to which a current location of the target vehicle belongs.

5. The method according to claim 1, wherein the sequentially performing feature extraction on the vehicle traveling information in the traveling moment order according to the plurality of feature extraction windows in each of the sub-networks comprises:

generating, according to vehicle traveling information at a traveling moment corresponding to a current feature extraction window and hidden state information that is outputted by a previous feature extraction window, hidden state information of the current feature extraction window.

6. The method according to claim 5, wherein the generating, according to vehicle traveling information at a traveling moment corresponding to a current feature extraction window and hidden state information that is outputted by a previous feature extraction window, hidden state information of the current feature extraction window comprises:

calculating, according to the vehicle traveling information at the traveling moment corresponding to the current feature extraction window and the hidden state information that is outputted by the previous feature extraction window, candidate state information, an input weight of the candidate state information, a forget weight of target state information of the previous feature extraction window, and an output weight of target state information of the current feature extraction window;

retaining the target state information of the previous feature extraction window according to the forget weight, and obtaining first intermediate state information;

retaining the candidate state information according to the input weight of the candidate state information, and obtaining second intermediate state information;

obtaining the target state information of the current feature extraction window according to the first intermediate state information and the second intermediate state information; and retaining the target state information of the current feature extraction window according to the output weight of the target state information of the current feature extraction window, and obtaining the hidden state information of the current feature extraction window.

7. The method according to claim 1, wherein the performing feature fusion on the feature extraction results outputted by the sub-networks comprises:

splicing the feature extraction results outputted by the sub-networks, to implement the feature fusion on the feature extraction results.

8. The method according to claim 7, wherein the splicing the feature extraction results outputted by the sub-networks, to implement the feature fusion on the feature extraction results comprises:

performing, according to preset weights, weighting processing on the feature extraction results outputted by the sub-networks, and splicing weighting processing results, to implement the feature fusion on the feature extraction results.

9. The method according to claim 1, wherein the predicting a vehicle lane change intention according to a feature fusion result comprises:

determining, according to the feature fusion result, a distribution of probabilities that the target vehicle belongs to types of lane change intentions; and predicting the vehicle lane change intention according to the probability distribution, wherein the lane change intention of the target vehicle comprises vehicle state information of the target vehicle at a future moment.

10. The method according to claim 1, further comprising: training the lane change intention prediction network, including:

inputting sample data into a lane change intention prediction network to be trained, the sample data comprising a plurality of types of sample vehicle traveling information and a labeled vehicle lane change intention;

performing, through the sub-networks, feature extraction on the types of sample vehicle traveling information respectively, and outputting sample feature extraction results;

performing feature fusion on the sample feature extraction results outputted by the sub-networks, and predicting a sample vehicle lane change intention according to a sample feature fusion result; and performing parameter adjustment on the lane change intention prediction network according to the sample vehicle lane change intention and the labeled vehicle lane change intention.

11. A non-transitory computer-readable storage medium, storing a computer program, the computer program, when executed by a processor, implementing a method for automatic control of a vehicle comprising:

receiving a plurality of types of vehicle traveling information of a target vehicle;

inputting the plurality of types of vehicle traveling information of the target vehicle into a lane change intention prediction network, the lane change intention prediction network comprising a plurality of sub-networks being in a one-to-one correspondence with the plurality of types of vehicles, the lane change intention prediction network being used for predicting a lane change intention of a vehicle in a traveling state, each of the sub-networks comprises a plurality of feature extraction windows, and the feature extraction windows correspond to feature extraction at different traveling moments;

sequentially performing, through each of the sub-networks, feature extraction on the types of vehicle traveling information in a traveling moment order according to the plurality of feature extraction windows in each of the sub-networks, and outputting feature extraction results;

performing feature fusion on the feature extraction results outputted by the sub-networks, and predicting a lane change intention of the target vehicle according to a feature fusion result; and updating an autonomous driving route of a current vehicle according to the lane change intention of the target vehicle.

12. The computer-readable storage medium according to claim 11, wherein the plurality of types of vehicle traveling information comprise vehicle state information, interaction information of a nearby vehicle, and road network information that corresponds to each traveling moment.

13. The computer-readable storage medium according to claim 12, wherein the vehicle state information comprises at least one of current location coordinates of the target vehicle, a transverse distance to a center line of a lane, an orientation of a vehicle head, and speed information;

the interaction information of a nearby vehicle comprises at least one of location information of a preset quantity of surrounding vehicles and relative speed information of the surrounding vehicles and the target vehicle; and the road network information comprises at least one of lane information, a traffic signal, an intersection, and a road definition.

14. The computer-readable storage medium according to claim 13, wherein the road network information corresponds to a region to which a current location of the target vehicle belongs.

15. The computer-readable storage medium according to claim 11, wherein the sequentially performing feature extraction on the vehicle traveling information in the traveling moment order according to the plurality of feature extraction windows in each of the sub-networks comprises:

generating, according to vehicle traveling information at a traveling moment corresponding to a current feature extraction window and hidden state information that is outputted by a previous feature extraction window, hidden state information of the current feature extraction window.

16. The computer-readable storage medium according to claim 15, wherein the generating, according to vehicle traveling information at a traveling moment corresponding to a current feature extraction window and hidden state information that is outputted by a previous feature extraction window, hidden state information of the current feature extraction window comprises:

calculating, according to the vehicle traveling information at the traveling moment corresponding to the current feature extraction window and the hidden state information that is outputted by the previous feature extraction window, candidate state information, an input weight of the candidate state information, a forget weight of target state information of the previous feature extraction window, and an output weight of target state information of the current feature extraction window;

retaining the target state information of the previous feature extraction window according to the forget weight, and obtaining first intermediate state information;

retaining the candidate state information according to the input weight of the candidate state information, and obtaining second intermediate state information;

obtaining the target state information of the current feature extraction window according to the first intermediate state information and the second intermediate state information; and retaining the target state information of the current feature extraction window according to the output weight of the target state information of the current feature extraction window, and obtaining the hidden state information of the current feature extraction window.

17. The computer-readable storage medium according to claim 11, wherein the performing feature fusion on the feature extraction results outputted by the sub-networks comprises:

splicing the feature extraction results outputted by the sub-networks, to implement the feature fusion on the feature extraction results.

18. An electronic device, comprising:

a processor; and a memory, configured to store instructions executable to the processor, the processor being configured to execute the executable instructions to perform:

receiving a plurality of types of vehicle traveling information of a target vehicle;

inputting the plurality of types of vehicle traveling information of the target vehicle into a lane change intention prediction network, the lane change intention prediction network comprising a plurality of sub-networks being in a one-to-one correspondence with the plurality of types of vehicles, the lane change intention prediction network being used for predicting a lane change intention of a vehicle in a traveling state, each of the sub-networks comprises a plurality of feature extraction windows, and the feature extraction windows correspond to feature extraction at different traveling moments;

sequentially performing, through each of the sub-networks, feature extraction on the types of vehicle traveling information in a traveling moment order according to the plurality of feature extraction windows in each of the sub-networks, and outputting feature extraction results;

performing feature fusion on the feature extraction results outputted by the sub-networks, and predicting a lane change intention of the target vehicle according to a feature fusion result; and updating an autonomous driving route of a current vehicle according to the lane change intention of the target vehicle.

* * * * *